(12) United States Patent
Saito et al.

(10) Patent No.: US 6,437,779 B1
(45) Date of Patent: Aug. 20, 2002

(54) IMAGE PROCESSING METHOD IMAGE PROCESSING UNIT AND RECORDING MEDIUM RECORDING INTEGRATED SHAPING MODEL DATA AND IMAGE PROCESSING PROGRAM TO BE USED THEREOF

(75) Inventors: Tomoaki Saito; Takashi Ando, both of Tokyo (JP)

(73) Assignee: Sega Enterprises, Ltd. (JP)

( * ) Notice: Subject to any disclaimer, the term of this patent is extended or adjusted under 35 U.S.C. 154(b) by 0 days.

(21) Appl. No.: 09/506,812

(22) Filed: Feb. 18, 2000

(30) Foreign Application Priority Data

Feb. 23, 1999 (JP) .............................. 11-045535

(51) Int. Cl.[7] .............................................. G06T 15/20
(52) U.S. Cl. ....................................................... 345/420
(58) Field of Search .................................. 345/419, 420, 345/473, 474, 475

(56) References Cited

U.S. PATENT DOCUMENTS 5,659,625 A * 8/1997 Marquardt ................... 345/435
6,147,692 A * 11/2000 Shaw et al. .................. 345/433

* cited by examiner

Primary Examiner—Phu K. Nguyen

(74) Attorney, Agent, or Firm—Dickstein Shapiro Morin & Oshinsky LLP

(57) ABSTRACT

The present invention is an image processing method for drawing an integrated shaping model which has a plurality of models linked by a hierarchical structure, where at least a first models has a plurality of vertices constituting polygons and at least the position of a first vertex is influenced by positions of a plurality of models and weight values from these models. The data (110) of the integrated shaping model comprises: format data of a common vertex buffer which stores data on the plurality of vertices in the plurality of models for each model; a vertex list which is created for each model which influences the vertices and has vertex data specified by a vertex ID in the common vertex buffer; and a polygon list which is created for each model having the polygon and includes polygon data where the vertex ID is attribute data. The image processing method comprises steps of: generating the common vertex buffer corresponding to the plurality of models in the sequence of tracing of the hierarchical structure according to the format data; generating model matrix data where the positions of the models are set based on the game progress data; generating common vertex data by executing the matrix calculation for generating vertex data after movement according to the model matrix data weight calculation for integrating the weight values from the models to the vertex data after movement, for the vertex data of the vertex list of the models, and by storing or adding this operated vertex data to areas according to the vertex IDs in the common vertex buffer; and rendering the polygon according to the common vertex data.

28 Claims, 24 Drawing Sheets

Movement of Integrated Shaping Model (Envelope)

Integrated Shaping Model (Envelopes)
FIG. 1A Basic Form
(PRIOR ART)
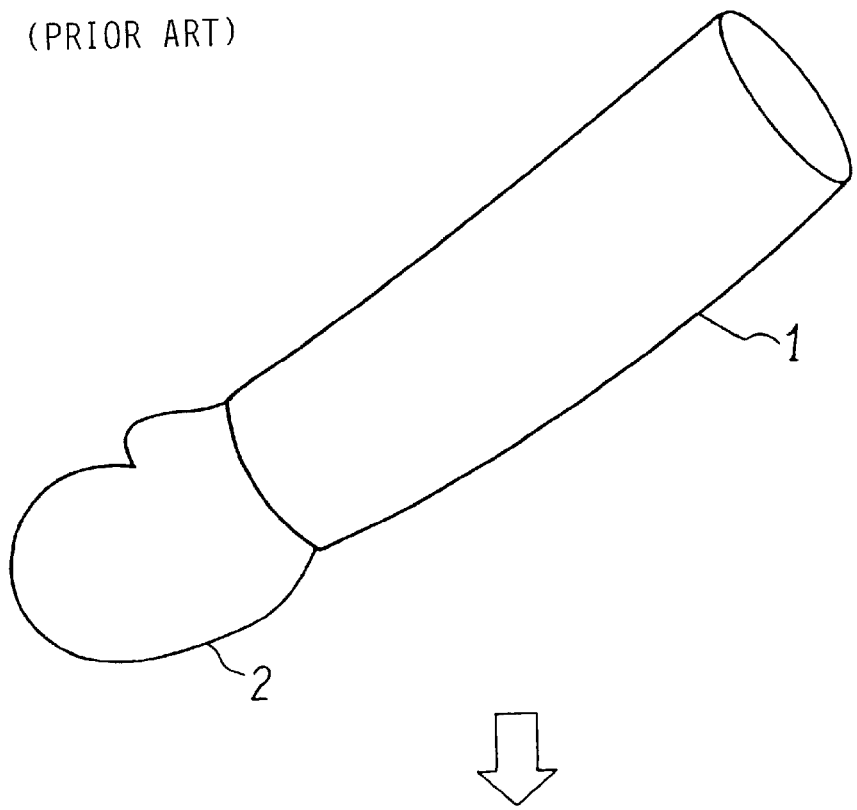
FIG. 1B Moved Form
(PRIOR ART)
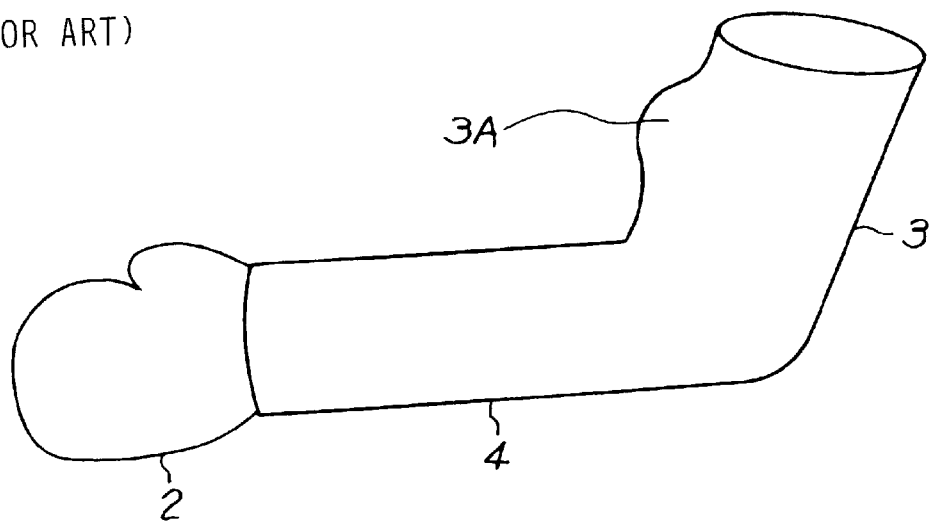

Integrated Shaping Model (Envelopes)

Data Configuration of Integrated Shaping Model

FIG. 6

| Model | Influencing Model / Vertex | M1 | M2 | M3 | M4 | M5 |
|---|---|---|---|---|---|---|
| M1 | V101 | 100% | | | | |
| | V102 | | 30% | 30% | 40% | |
| | V103 | | 30% | 30% | 40% | |
| | V104 | | 40% | 60% | | |
| | V105 | | 40% | 60% | | |
| | V106 | | | 100% | | |
| | V107 | 100% | | | | |
| | V108 | | 60% | 40% | | |
| | V109 | | 60% | 40% | | |
| | V110 | | 40% | 60% | | |
| | V111 | | 40% | 60% | | |
| | V112 | | | 100% | | |
| | V113 | | | | 100% | |
| M5 | V501 | | | | | 100% |
| | V502 | | | | | 100% |
| | V503 | | | | | 100% |
| | V504 | | | | | 100% |
| | V505 | | | | | 100% |
| | V506 | | | | | 100% |

Movement of Integrated Shaping Model (Envelope)

FIG. 8A  Basic Form
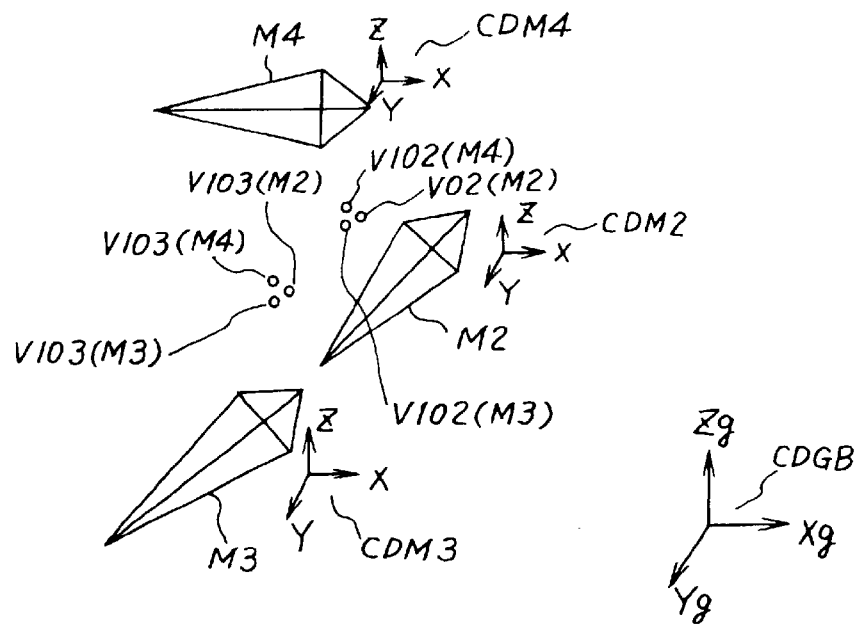
FIG. 8B  Moved Form
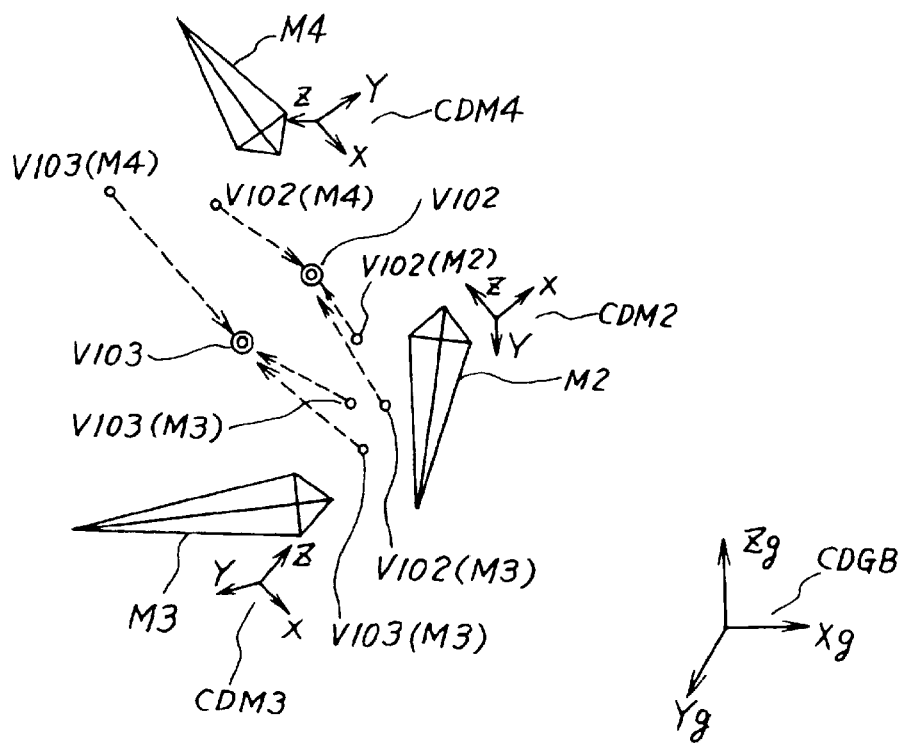

Model Movement Calculation (Matrix Calculation) and Weight Calculation

FIG. 10
Original Data of Integrated Shaping Model according to 3D Modeler
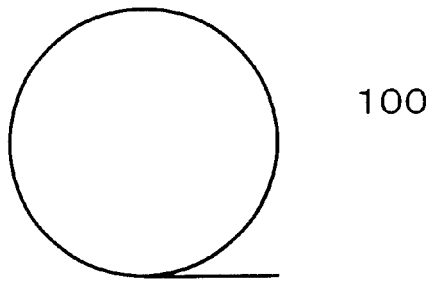
100
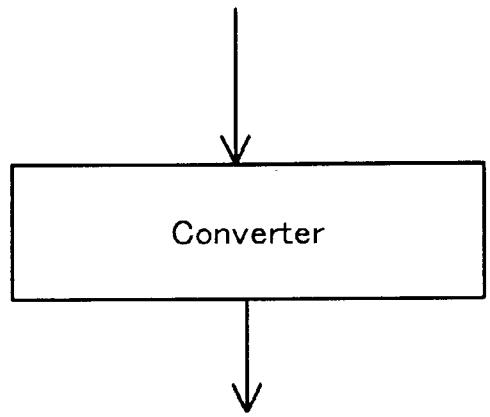
Converter
Conversion Data for Drawing Library
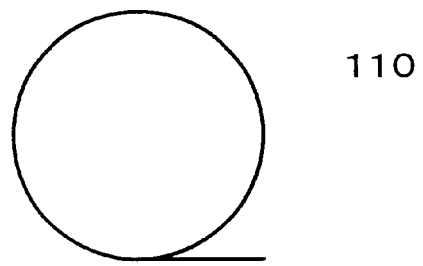
110
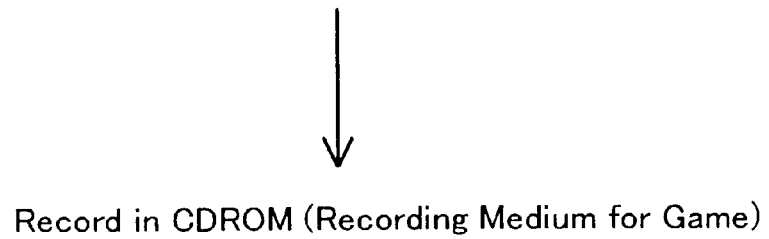
Record in CDROM (Recording Medium for Game)

Converter and Conversion Data

Game Machine and Drawing Library

Procedure of Converter (1)

Procedure of Converter (2)

Distribution of Actual Vertices to Models and Generation of Vertex List

Convert Original Data to Conversion Data

Vertex List 117

FIG. 20
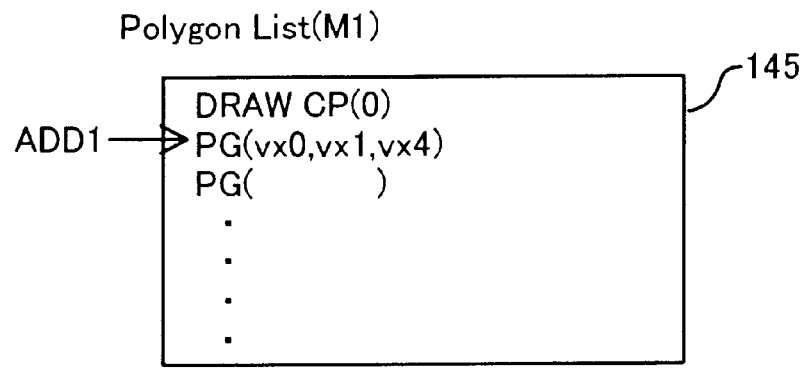
Polygon List(M1)
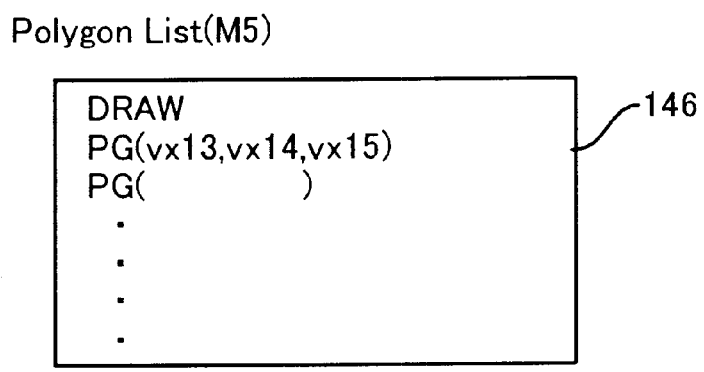
Polygon List(M5)
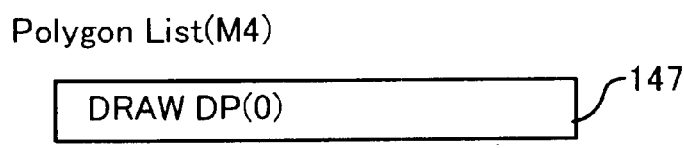
Polygon List(M4)
FIG. 21 Non-drawing Table
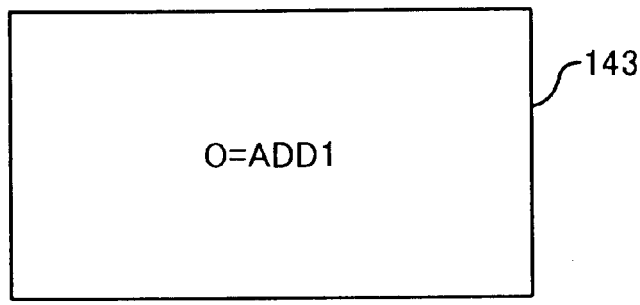

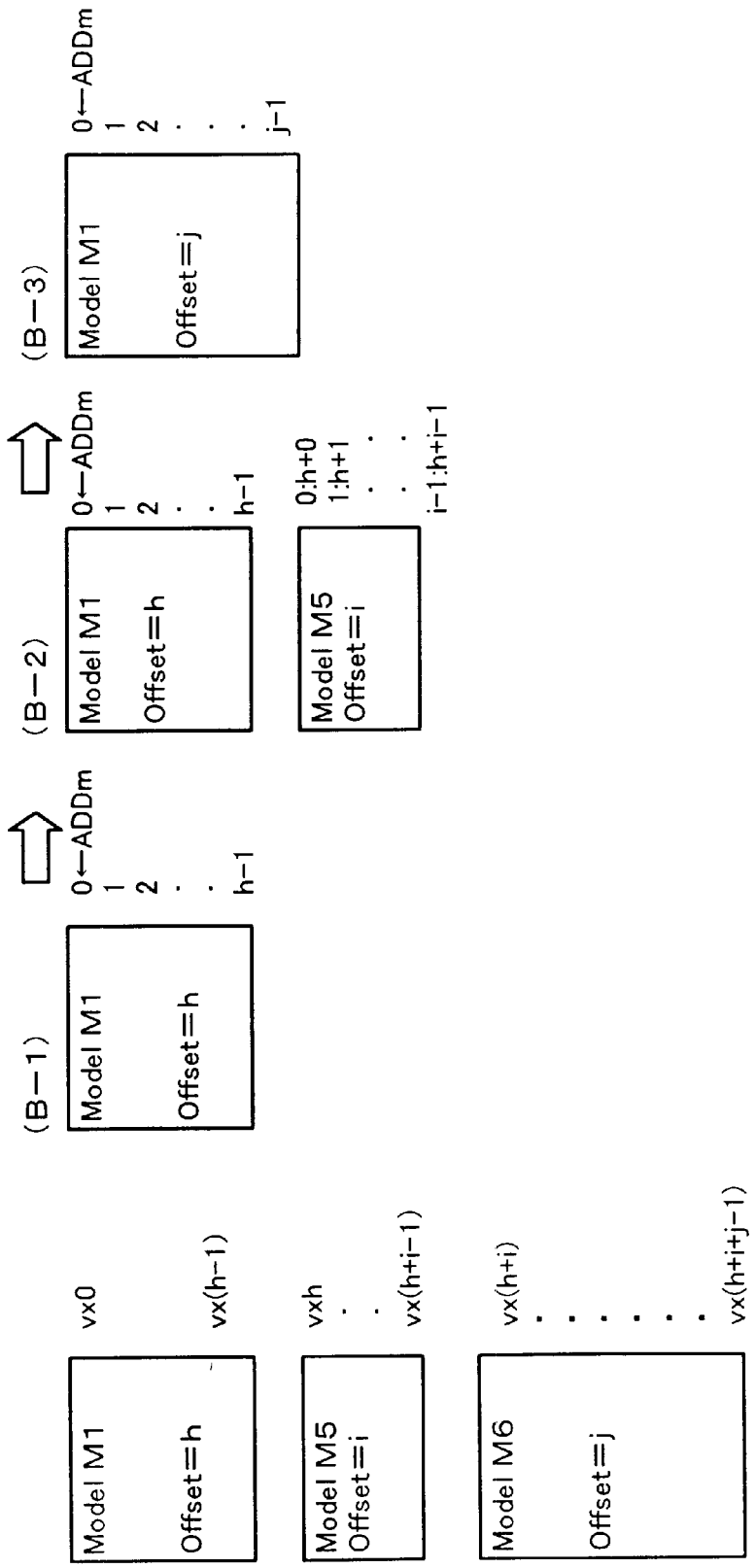

FIG. 23
Example of Vertex List

```
         /200
VLIST   /201  vertex_list1[]
START  /211    /212   /213                            218
       CnkV_VN(FV_CONT, 55),
          214\    /215
216\   Offnbldx(98, 9),
217\   VERT( 0x408fc1d7, 0x3e94c1ef, 0xbf01b247 ),
       NORM( 0x3f01fa3b, 0x3f327e43, 0xbf018ba8 ),
       VERT( 0x408fcbdb, 0x3ec104ab, 0x3c910610 ),
       NORM( 0x3ee6e734, 0x3f641d71, 0x3d50e92e ),
       VERT( 0x409a3fed, 0xbc9d3460, 0xbb9f18c0 ),
       NORM( 0x3f7f633c, 0xbd8d5e8c, 0xbb730d7c ),
      /221    /212   /222   /213
       CnkV_VN_NF(FV_CONT|FW_START, 169),
          214\    /215                                 228
216\   Offnbldx(108, 24),      /226    /227
217\   VERT( 0x404d6e16, 0x3effb607, 0xbf8b71bd ),
       NORM( 0x3d188593, 0x3f44cfcc, 0xbf236ecc ),
       NFlagsW( 0,  49.983261 ),
       VERT( 0x408719d8c, 0x3f02c228, 0x3f81db3f ),
       NORM( 0x3dcd10e8, 0x3f49da46, 0x3f1b5a48 ),
       NFlagsW( 1,  22.523094 ),
       VERT( 0x4087948e, 0xbba94240, 0x3fa30fa6 ),
       NORM( 0x3dfa8d19, 0xbd3a681e, 0x3f7dcf4e ),
       NFlagsW( 3,  26.207253 ),
      /221    /212   /232   /213
       CnkV_VN_NF(FV_CONT|FW_MIDDLE, 169),
          214\    /215                                 238
216\   Offnbldx(132, 24),      /226    /227
217\   VERT( 0x404d92df, 0xbef36b61, 0x3f866400 ),
       NORM( 0x3d03aaec, 0xbf5ee707, 0x3efb4258 ),
       NFlagsW( 0,  49.985958 ),
       VERT( 0x404d8689, 0xbeb4533b, 0xbf8db2cd ),
       NORM( 0x3d16d159, 0xbf4f1bbf, 0xbf162d8f ),
       NFlagsW( 1,  49.985447 ),
       VERT( 0x400e1897, 0xbf148850, 0xbd1a7260 ),
       NORM( 0x3d940a54, 0xbf7ee86c, 0xbd6ae4c6 ),
       NFlagsW( 2,  93.426033 ),
       VERT( 0x404d9c83, 0xbf150deb, 0xbd1c5780 ),
       NORM( 0x3cb3ddd3, 0xbf7f8586, 0xbd699996 ),
       NFlagsW( 3,  49.948112 ),
      /221    /212   /242   /213
       CnkV_VN_NF(FV_CONT|FW_END, 169),
          214\    /215                                 248
216\   Offnbldx(0, 24),        /226    /227
217\   VERT( 0x3c9e3800, 0xbef388fa, 0x3f866400 ),
       NORM( 0x3cbe5797, 0xbf5ef998, 0x3efb4258 ),
       NFlagsW( 132,  50.014042 ),
       VERT( 0x3ca2d200, 0xbeb4703a, 0xbf8db2cd ),
       NORM( 0x3ce98fb8, 0xbf4f31a3, 0xbf162d8f ),
       NFlagsW( 133,  50.014545 ),
       VERT( 0xbf793a48, 0xbf11fd7a, 0xbd1a7260 ),
       NORM( 0x3d7e560c, 0xbf7f1579, 0xbd6ae4c6 ),
       NFlagsW( 134,  6.573956 ),
              /202
          CnkEnd()
END\
    \203
```

Procedure of Drawing Library

One Weight Vertex

IMAGE PROCESSING METHOD IMAGE PROCESSING UNIT AND RECORDING MEDIUM RECORDING INTEGRATED SHAPING MODEL DATA AND IMAGE PROCESSING PROGRAM TO BE USED THEREOF

BACKGROUND OF THE INVENTION

1. Field of the Invention

The present invention relates to an image processing method for processing images in real-time, an image processing method for generating an image data structure suitable for processing images in real-time, and a recording medium recording the image data structure or image processing program concerned.

2. Description of the Related Art

In a home video game machine, moving pictures of objects of a game are created in real-time synchronizing with the progress of the game. For the image processing in such a game machine, it is necessary to move the positions of the objects in the game responding to the input control signals of the operator within a short period, a frame period for example, and to draw images corresponding to the movement positions in the image memory (frame memory).

In order to express movement more naturally, it is necessary that characters, e.g. living creatures, as the objects of the game can move joint parts and muscle parts along with the movement of limbs and necks, and that the joint part becomes a different shape according to the movement of other polygons. In other words, in order to express more natural movement, the part between the upper arm and shoulder of an individual or the part between the upper arm and lower arm requires such movement as raising the muscles of the upper arm and shoulder depending on the movement of the polygons.

A drawing method for giving natural movement to such joint parts specifies the vertices to be connected for models on both sides of the joint, and adds a polygon for the joint between the vertices. With such a drawing method, however, the joint part is drawn by standardized polygons, where movement corresponding to the change of angle cannot be expressed, and as a result pictures to be generated appear unnatural.

In order to draw more natural movement, it is proposed to utilize integrated shaping models called "envelopes" using three dimensional modelers in the field of image processing of movies such as CG movies (movies using computer graphics), which do not require real-time processing. In these integrated shaping models, objects (characters) are comprised of polygons and bones which influence the polygons. In other words, an integrated shaping model is comprised of polygons, which are the outer surface of the character and are drawn based on actual movement, and bones, which influence the positions of the polygons with a predetermined weight. New positions of bones which influence the positions of the polygons are computed by a position conversion matrix determined according to the operation input of the operator, and the positions of the vertices of the polygons are determined according to the degree of influence (weight) from the bones. Complicated movements can be expressed by polygons by executing rendering (drawing) on the polygons based on the determined vertices.

FIG. 1 is a drawing depicting an example of movement of the above mentioned integrated shaping model in a CG movie. The model shown in FIG. 1 is a model comprised of an arm part 1 and a hand part 2, and FIG. 1A shows the basic form of the model. When the arm is bent such that the upper arm 3 of the arm part 1 becomes more vertical and the lower arm part 4 of the arm part 1 becomes more horizontal from the basic form, the state shown in FIG. 1B is expected. In other words, the joint part connecting the upper arm 3 and the lower arm part 4 exhibit a natural bent shape and the inner muscles 3A of the upper arm 3 tense up.

FIG. 2 is an explanatory drawing depicting conventional image processing using an integrated shaping model in CG movies. FIG. 3 is a flow chart depicting the image processing procedure thereof. FIG. 2 shows the data structure 620 of the integrated shaping model (envelope). In this example, a total of seven models, models 1–7, are in the tree type hierarchical structure shown in FIG. 2. The data structure of each model is the same as the data 624 of the model 4 and the data 627 of the model 7.

When a model has polygons to be displayed, the model has vertices which are the composing elements of the polygons. Therefore the data structure 624 of the model 4 includes the vertex list 632 and the polygon list 635 of the polygons comprised of a combination of the vertices. The vertex list 632 includes position information and normal line data of each vertex in model local coordinates. Each model also has a model matrix 631, which is information denoting relative position with respect to a model in the higher hierarchy. The model 4, for example, has rotation, shift (translation) and size (scale) as the relative position information with respect to model 3. The model matrix 631 comprised of such position information, can also be matrix data when the coordinate system of model 3 is converted to the coordinate system of model 4.

The data structure 624 of the model 4 also has the weight list 633 including the vertices of other models which model 4 influences, and the weight values, which indicate the degree of that influence. In the case of the example in FIG. 1, for example, the model of the lower arm 4 influences the muscle part 3A of the upper arm 3 with a predetermined weight value. Therefore in the weight list of the model of the lower arm part 4, the ID of the model of the upper arm 3, the indexes of the vertices thereof (vertex IDs) and the weight values are included.

If the model 4 of the model structure in FIG. 2 is the lower arm part 4 in FIG. 1, and the model 7 is the upper arm part 3, then the positions of vertices of the muscle part 3A in the upper arm part 3 model change, influenced by the movement of the upper arm part 3 and the movement of the lower arm part 4, and the image where the muscle part 3A rises is drawn. Now the image processing procedure by a three dimensional modeler, which is generally used for CG movies, will be explained according to FIG. 3. At first, the matrix for implementing the movements of all models is calculated and saved in the data structure of each model (Step 602). Then referring to the weight list 633, vertex coordinates and normal line data (vertex data) indicated by the vertex indexes (vertex IDs) of the model (model 7) which is influenced by the target model (model 4) are read from the vertex list 632 of the model 7 (Step 603), the read vertex data is converted to the vertex data when the vertex data belongs to the local coordinate system of the model 4 based on the relationship in the basic form, and the converted vertex coordinates and normal line data are multiplied by the model matrix of the model 4 (Step 604). Also the vertex coordinates and the normal line data multiplied by the model matrix are multiplied by the weight value in the weight list 633, and the values are integrated with the values in the weight vertex list 634 in the data structure 627 of the model 7.

The above procedures 603, 604 and 605 are executed for the entire weight list (Step 606) and are executed for all models (Step 607). As a result, coordinate conversion corresponding to the movement of characters at actual vertices of all models, and the position movement according to the degree of influence from other models are executed. Then the normal line vectors of the weight vertex list of all models are normalized so that the normal vectors can be used for light source processing in rendering, which is executed later (Step 608). And referring to the vertex positions in the weight vertex list, the drawing (rendering) of the polygons in the polygon list is executed (Step 609).

For the above operations, the matrix operation and weight operation are executed for the vertices of all models, and rendering processing for the polygons is executed after the above operations complete. Or, one vertex is focused on and the matrix operation and weight operation of models which influence the vertex are executed, then the new vertex coordinate of the vertex is determined, and final rendering processing is executed.

This image processing method for CG movies, however, cannot be applied to high-speed image processing executed in real-time in a game machine. When the matrix operation and weight operation are executed for the vertices of all models, the operations must be executed with reference to the vertex lists and model matrixes of different models in the data structure of the model. If such operations are executed involving a reference procedure using a pointer in the hierarchical structure of the model data distributed in memory, the pointer must be changed frequently. There are shortcomings to executing such operations in a game machine, since the working efficiency of the cache memory disposed in the CPU of the game machine is poor. Also when the matrix operation and the weight operation are executed for one vertex focusing on the vertex, the buffer area for the weight operation must be secured for all vertices. If this operation is executed in a simple-structured game machine, as opposed to a supercomputer having a large capacity memory and a high-speed processing capacity, the memory area required will be enormous, and real-time processing is difficult, making operation impractical.

SUMMARY OF THE INVENTION

With the foregoing in view, it is an object of the present invention to provide an image processing method which allows image processing in real-time utilizing integration shaping models, an image processing method for generating image data on integrated shaping models used for the image processing thereof, and a recording medium recording the image data and the image processing program concerned.

It is another object of the present invention to provide an image processing method based on a converter program for generating image data, which allows image processing in real-time utilizing integrated shaping models, from three dimensional model data.

It is still another object of the present invention to provide an image processing method for transforming joint parts into a natural shape according to the movement of a character, a recording medium recording an image processing program to execute the image processing method and a recording medium recording data having a structure suitable for the image processing.

To achieve the above objectives, the present invention is a computer-readable recording medium recording integrated shaping model data having a plurality of models linked by a hierarchical structure where at least a first model has a plurality of vertices constituting polygons, and at least the position of a first vertex is influenced by positions of a plurality of models and weight values from these models, comprising: format data of a common vertex buffer for saving the data on the plurality of vertices in the plurality of models for each model; a vertex list which is created for each one of the models which influence the vertices and has vertex data specified by a vertex ID in the common vertex buffer; model matrix data which is created for each one of the models and sets the model positions of the plurality of models in basic forms; and a polygon list which is created for each one of the models having the polygons and has polygon data where the vertex ID is attribute data, wherein the vertex data in the vertex list has at least the position data of the vertex, a weight value from the model where the vertex list belongs, and vertex ID in the common vertex buffer corresponding to the vertex.

The above recording medium recording the integrated shaping model data allows image processing required for drawing models in real-time in a game machine.

The present invention is also the above mentioned invention, wherein the first vertex influenced by the plurality of models have distributed vertex data for the number of the plurality of models, and the distributed vertex data belongs to the vertex lists of the models which influence the first vertex.

The present invention is also the above mentioned invention, wherein the vertex list is divided into start weight vertices, for which the vertex operation is executed first when tracing is executed according to the hierarchical structure of the models, middle weight vertices, for which the vertex operation is not executed first or last, and end weight vertices, for which the vertex operation is executed last.

The present invention is also the above invention, wherein the vertex list further has data on native vertices which are influenced only by the model which this vertex list belongs to.

The present invention is also the above invention, wherein the vertex data has coordinate data and normal line data of the vertices.

The present invention is also the above invention, wherein the vertex data follows a local coordinate system of the model of the vertex list which the vertex data belongs to.

The present invention is also the above invention, wherein the vertex ID in the common vertex buffer has an entry number of the vertex of each model and the offset value corresponding to the number of vertices of each model.

The present invention is also the above invention, wherein the polygon list has a drawing command which instructs the drawing of the polygon of a predetermined model, or a non-drawing command which instructs not to draw the polygon of the model which this polygon list belongs to.

To achieve the above objectives, the present invention is a computer-readable recording medium recording integrated shaping model data, having a plurality of models linked by a hierarchical structure where at least a first model has a plurality of vertices constituting polygons, and at least a first vertex position is influenced by positions of a plurality of models and weight values from these models, comprising: format data of a common vertex buffer for saving the data on the plurality of vertices in the plurality of models for each model; a vertex list which is created for each one of the models which influence the above vertices and has vertex data specified by a vertex ID in the common vertex buffer; and a polygon list which is created for each one of the models having the polygons and has the polygon data where the vertex ID is attribute data.

To achieve the above objectives, the present invention is an image processing method for converting original model data into integrated shaping model data having a plurality of models linked by a hierarchical structure where at least a first model has a plurality of vertices constituting polygons, and at least the position of a first vertex is influenced by positions of a plurality of models and weight values from these models, wherein the original model data has a plurality of model data linked by the hierarchical structure, the original model data comprises an original vertex list having vertex data of this model, a weight list having vertex data on vertices which this model influences, and an original polygon list where the vertex ID of the vertex list is attribute data, and the above image processing method comprises the steps of: generating format data of a common vertex buffer to store data on the plurality of vertices in the plurality of models for each model; generating a vertex list which is created for each model which influences the vertex, and has vertex data specified by a vertex ID in the common vertex buffer; and generating a polygon list which is created for each model having the polygons where the vertex ID is attribute data.

According to the above image processing method, conversion data for an integrated shaping model which allows image processing in real-time can be generated.

The present invention is also the above image processing method, wherein the vertex data in the vertex list has at least the position data of the vertices, weight values from the model which the vertex list belongs to, and vertex IDs in the common vertex buffer corresponding to these vertices.

The present invention is also the above image processing method, wherein the step for generating the vertex list generates distributed vertices for the number of the plurality of models for the first vertex which is influenced by the plurality of models, and distributes the data on the distributed vertices to the vertex list of the models which influence the first vertex.

The present invention is also the above image processing method, wherein the step for generating the vertex list divides the vertex data into data for start weight vertices, for which the vertex operation is executed first when tracing is executed according to the hierarchical structure of the models, data for middle weight vertices, for which the vertex operation is not executed first or last, and data for end weight vertices, for which the vertex operation is executed last, in the vertex list.

The present invention is also the above image processing method, where the vertex ID has an entry number of the vertex in each model, and an offset value corresponding to the number of vertices of each model.

The present invention is also the above image processing method, wherein the above image processing method further has a drawing command generation step where: a dummy vertex operation is executed for the vertex data in the vertex list of the model according to the sequence of tracing following the hierarchical structure of the models; when the dummy vertex operation for the vertex list of one model ends, a non-drawing command is generated in the polygon list of this model if the weight calculation for the vertices of this model has not ended; and a drawing command for the non-drawing model is generated in the polygon list of the target model of the dummy vertex operation if the weight calculation for the vertices of the non-drawing model ends.

The present invention is also the above image processing method, wherein the above image processing method further has a one weight vertex list generation step, where the first vertex which is influenced by the plurality of models is converted to a vertex which is influenced only by a model having the largest degree of influence among the plurality of models, and the data on the converted vertex is distributed to the vertex list of this model.

To achieve the above objectives, the present invention is an image processing method for drawing an integrated shaping model which has a plurality of models linked by a hierarchical structure, where at least a first model has a plurality of vertices constituting polygons and at least the position of a first vertex is influenced by positions of a plurality of models and weight values from these models, wherein the data of the integrated shaping model comprises: format data of a common vertex buffer which stores data on the plurality of vertices in the plurality of models for each model; a vertex list which is created for each model which influences the vertices and has vertex data specified by a vertex ID in the common vertex buffer; and a polygon list which is created for each model having the polygons and includes polygon data where the vertex ID is attribute data, the image processing method comprising steps of: generating the common vertex buffer corresponding to the plurality of models in the sequence of tracing of the hierarchical structure according to the format data; generating model matrix data where the positions of the models are set based on the game progress data; generating common vertex data by executing the matrix calculation for generating vertex data after movement according to the model matrix data and weight calculation for integrating the weight values from the models to the vertex data after movement, for the vertex data of the vertex list of the models, and by storing or adding this operated vertex data to areas according to the vertex IDs in the common vertex buffer; and rendering the polygons according to the common vertex data.

According to the above image processing method, characters of the integrated shaping models can be drawn in real-time.

The present invention is also the above image processing method, wherein the vertex data in the vertex list has at least the position data of the vertex, weight values from the model which the vertex list belongs to, and the vertex IDs in the common vertex buffer corresponding to these vertices, and in the step of generating the common vertex data, the position data is multiplied by the model matrix for the above matrix calculation, and the above operated position data is multiplied by the weight value for the above weight calculation.

The present invention is also the above image processing method, wherein the vertex list is divided into start weight vertices, for which the vertex operation is executed first when tracing is executed according to the hierarchical structure of the models, middle weight vertices, for which the vertex operation is not executed first or last, and end weight vertices, for which the vertex operation is executed last, and in the step of generating the common vertex data, the operated vertex data for the start weight vertices is stored in areas corresponding to the vertex IDs in the common vertex buffer, and the operated vertex data for the middle weight vertices and end weight vertices are added to the vertex data in areas corresponding to the vertex IDs in the common vertex buffer.

The present invention is also the above image processing method, wherein the above polygon list has a drawing command instructing to draw the polygons of a predetermined model or a non-drawing command instructing not to draw the polygons of the model which this polygon list belongs to, and the above rendering step refers to the polygon list of the model each time the above common vertex data generation step of each model ends, and executes the above rendering according to the drawing command.

The present invention is also the above image processing method, further comprising a step for releasing the area of the common vertex buffer corresponding to the model for which the above rendering is executed.

The present invention is also the above image processing method, wherein the above model data also has a vertex list for one weight where the first vertex which influenced by the plurality of models is converted to a vertex which is influenced only by the model which degree of influence is largest among the plurality of models, and data of the vertex is distributed in the vertex list of this model, and the above image processing method generates the common vertex data for a predetermined model according to the vertex list for one weight.

To achieve the above objectives, the present invention provides a recording medium recording a program for a computer to execute the above mentioned image processing method. With this recording medium, characters of an integrated shaping model can be drawn in real-time in game machines.

BRIEF DESCRIPTION OF THE DRAWINGS

FIGS. 1A and 1B are drawings depicting an example of movement of an integrated shaping model in CG movies;

FIG. 6 is a drawing depicting the degree of influence (weight value) from the model to each vertex set by a designer;

FIGS. 8A and 8B are drawings depicting the weight calculation method in an integrated shaping model;

FIG. 10 is a drawing depicting the relationship between the original data of an integrated shaping model and the conversion data for the drawing library in the present embodiment;

FIG. 20 is a drawing depicting an example of a polygon list;

FIG. 21 is a drawing depicting an example of a non-drawing table;

FIGS. 22A and 22B are drawings depicting the opening and release of a common vertex buffer;

FIG. 23 is a drawing depicting another example of a vertex list;

DESCRIPTION OF THE PREFERRED EMBODIMENTS

Embodiments of the present invention will now be described with reference to the accompanying drawings. These embodiments, however, will not restrict the technical scope of the present invention.

Figure 4:
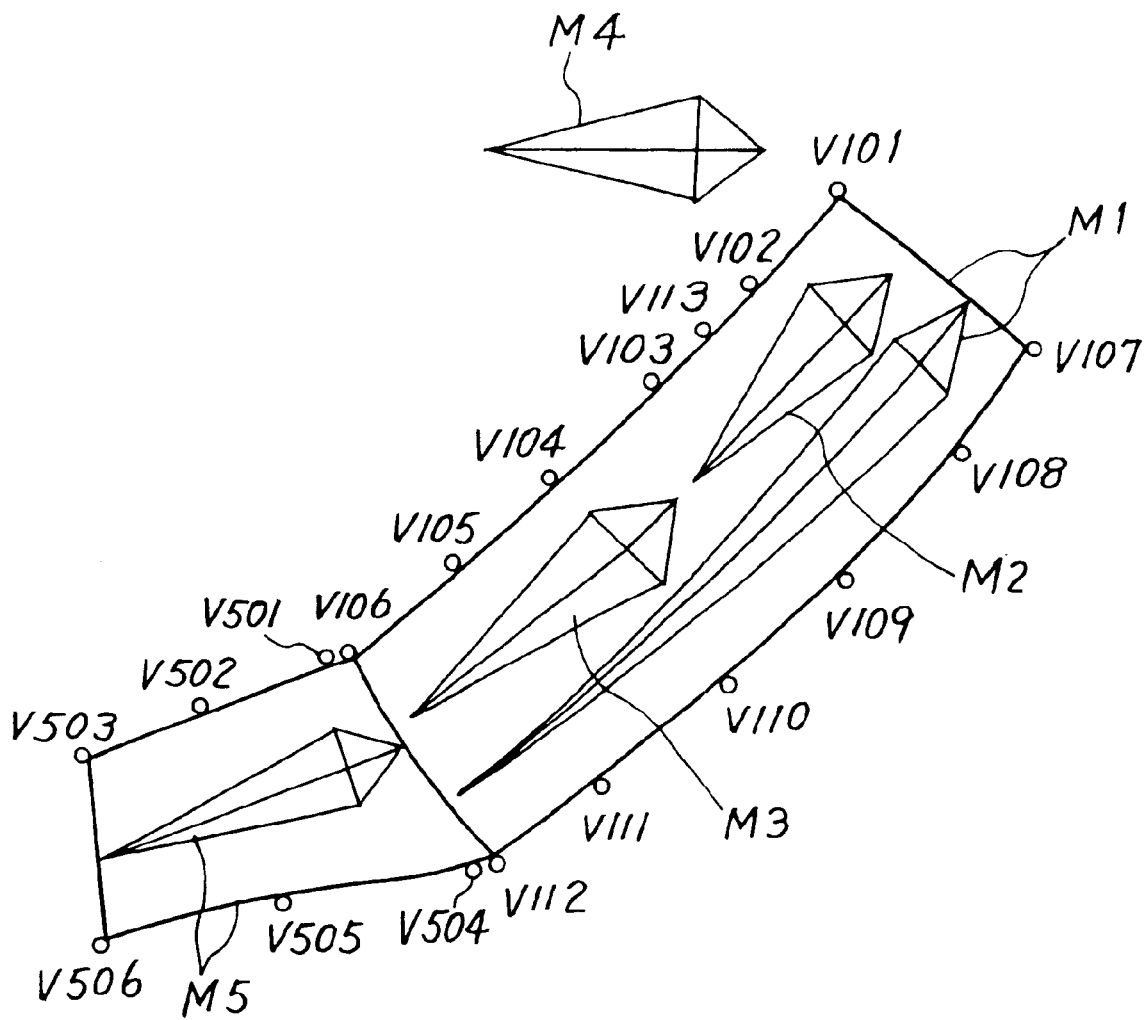
FIG. 4 is a drawing depicting an example of an integrated shaping model which is generated utilizing the three dimensional modeler in the present embodiment.

FIG. 4 is a drawing depicting an example of an integrated shaping model which is generated utilizing a three dimensional modeler according to the present invention. The integrated shaping model in FIG. 4 is an example to implement the movement of the arm shown in FIG. 1. The model M1 has a polygon which is actually displayed, and this polygon has a total of 13 actual vertices, V101—V113. The model M1 is, for example, an envelope enclosing the upper arm 3 and the lower arm part 4 in FIG. 1. The position of the model M1 has a 100% influence on the vertices V101 and V107, for example. Therefore the model M1 is a bone model having weight values for actual vertices.

The models M2, M3 and M4 do not have polygons, therefore they do not have actual vertices. The movement of the models M2, M3 and M4, however, influence a part of the vertices of model M1 according to predetermined weight values. In other words, the models M2, M3 and M4 are bone models having weight values for actual vertices. The model 5 has a polygon corresponding to the hand part 2 in FIG. 1, and the six actual vertices, V501–V506, constituting the polygon, are influenced not by other models but are 100% influenced by the position of the model M5 itself. Therefore the model M5 is a bone model which will influence its own vertices V501–V506.

The integrated shaping model shown in FIG. 4 is also called an "envelope", which is designed by the game designer by utilizing a three dimensional modeler. The designer designs such that each vertex is influenced by one or more models at a predetermined ratio. By moving the position of each model along with the execution of the game program, the positions of the vertices are moved according to the degree of influence (weight values) defined as initial values, and the desired movement of characters are implemented.

Figure 5:
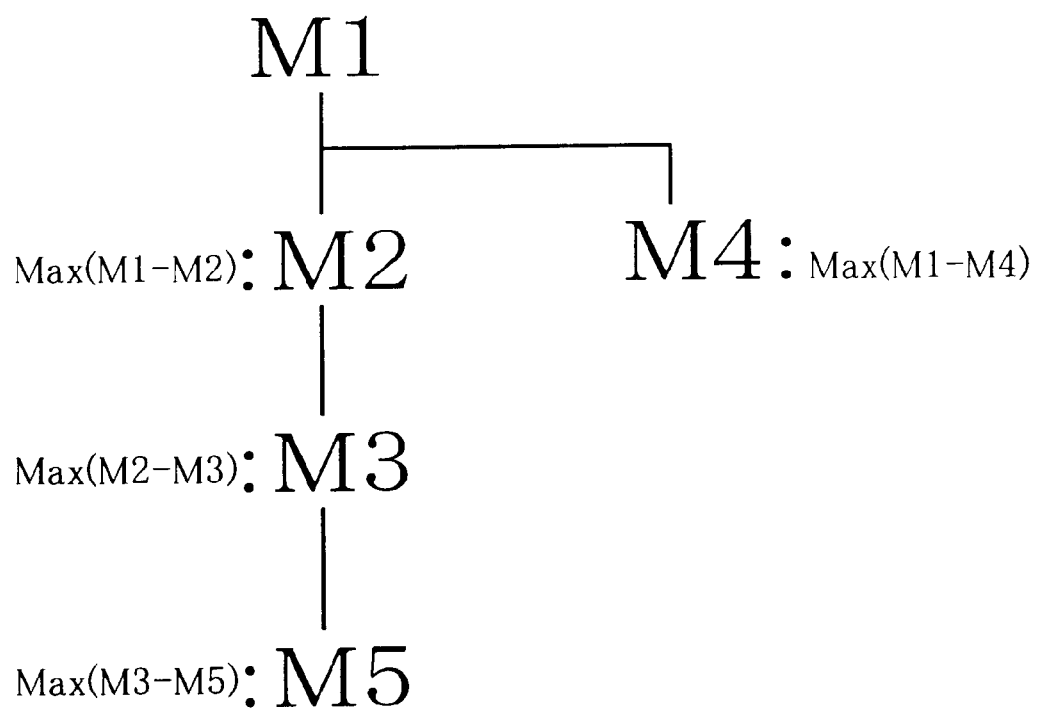
FIG. 5 is an example of the data configuration of the integrated shaping model in FIG. 4.

FIG. 5 is a data configuration example of the integrated shaping model in FIG. 4. The models M2, M3 and M5 are linked under the model M1, and the model M4 is also linked under the model M1. This kind of tree structure of data is an example of the hierarchical structure of models, and the models constituting an integrated shaping model can be linked within a hierarchical structure suitable for the respective program. In the case of the tree structure shown in FIG. 5, model data is generally traced in the sequence of models M1, M2, M3, M5 and M4. Such a sequence of tracing can be any sequence which is suitable for the program.

In the data configuration example in FIG. 5, each model has a model matrix which indicates how much the coordinate system of the model should move with respect to the coordinate system of the model in the higher hierarchy. In other words, the model matrix is data to set the position of the model. The coordinate system will be described later, but in this example, each model has the respective local coordinate system. A global coordinate system, which is common for all models, also exists which is separate from the local coordinate system. To define a position of the model M2 after movement, for example, the model matrix, which includes rotation, translation and scale, is used as the positional relationship of the local coordinate system of model M2 with respect to the local coordinate system of model M1. Therefore by executing the matrix operation which multiplies the model matrix with the positional coordinate data and normal line data of the local coordinate system of the model M2, the positional coordinate data and normal line data of the local coordinate system of the model M2 are converted to the positional coordinate data and normal line data of the local coordinate system of the model M1. If the model matrix of the model M1 is multiplied with the positional coordinate data and normal line data of the model M1, the positional coordinate data and normal line data in the global coordinate system can be determined.

In this way a character comprised of a plurality of models can have movement by the model matrix between the models. Normally such a model matrix, which indicates the movement of a character, is created by the geometry function in the game program. The model matrix may indicate the positional relationship between the global coordinate system and the local coordinate system of the model.

FIG. 6 is a drawing depicting the degree of influence (weight value) of a model to each vertex which is set by a designer. In the example shown in FIG. 6, the vertices V101 and V107 of the model M1 are 100% influenced by the movement of the model M1. Therefore the positions of the vertices V101 and V107 move while maintaining the same positional relationship along with the movement of the bone part of the model M1. The vertices V102 and V103 of the model M1 are influenced by the models M2, M3 and M4 according to the ratio of the weight values shown in FIG. 6. Therefore these vertices are influenced for the amount of weight values shown in FIG. 6 when the models M2, M3 and M4 move. If the model M4 moves upward for a long distance, for example, these vertices are influenced for 40% of the distance moved. If the vertices V102 and V103 correspond to the muscle part 3A of the upper arm part, for example, the muscle part 3A of the upper arm part can be risen appropriately by moving the model 4 for the appropriate distance.

The vertices V104, V105, and V108–V111 of the model M1 are influenced by the models M2 and M3 according to the ratio of weight values shown in FIG. 6. The vertices V106 and V112 are influenced only by the model M3. Therefore if the model M3 moves, then the vertices V106 and V112 move while maintaining the same positional relationship. The vertex V113 is influenced by the model M4 with a 100% weight value.

The model M5 is a part connected to the model M1, and corresponds to the hand part 2 in the example shown in FIG. 1. The hand part 2 does not have to change its shape depending on the position of the arm, and is 100% influenced by the bone part of the model M5.

The weight value of each vertex shown in FIG. 6 is set as an initial value by the designer who designed the character. The designer can freely control the position of each vertex by setting such weight values and moving the models by the model matrix during the progress of the game. If the positions of the vertices are determined, a polygon defined by a plurality of vertices can be rendered in the image memory by the drawing section (rendering section).

Figure 7:
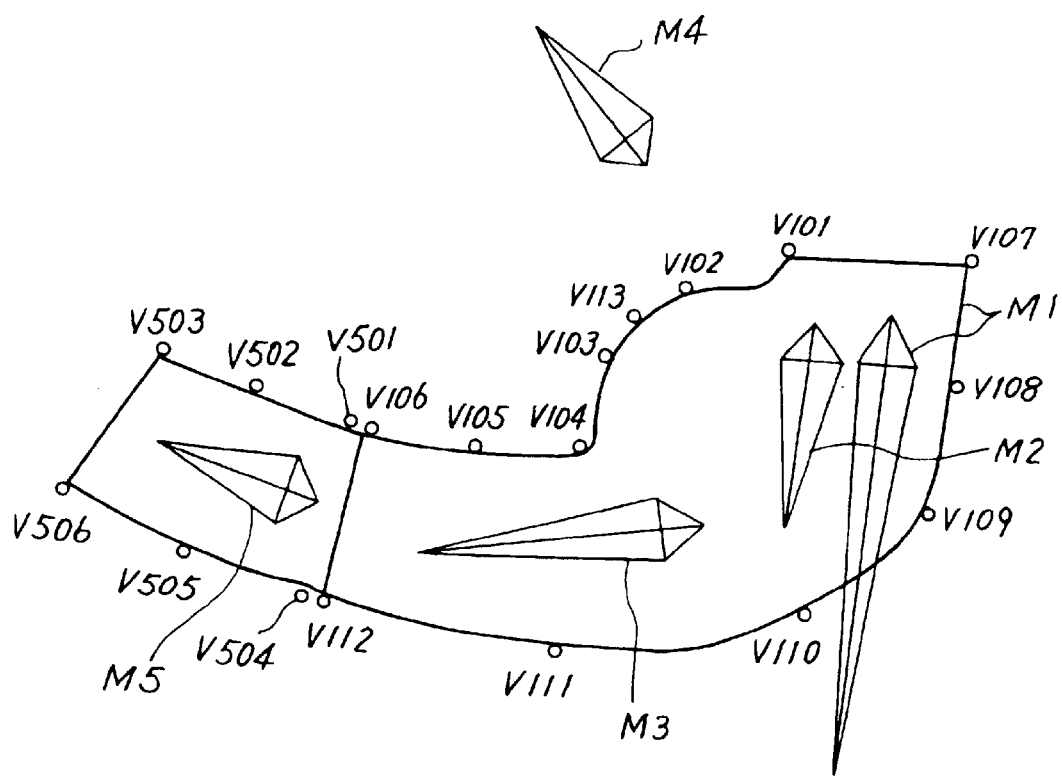
FIG. 7 is a drawing depicting an example of movement of an integrated shaping model (envelope)

FIG. 7 is a drawing depicting an example of the movement of an integrated shaping model (envelope). This example shows an integrated shaping model when the integrated shaping model in the basic form shown in FIG. 4 moves, as shown in FIG. 1B. In order to implement the movement shown in FIG. 1B, the models M1–M4 constituting the integrated shaping mode move as follows. The models M1 and M2 rotate in the vertical direction and the model M3 rotates in the horizontal direction. Along with this, the model M5 moves so as to match with the tip position of the model M3. The model M4 is a model used mainly for expressing the rising 3A of the muscle on the upper arm, rotating vertically upward, as shown in FIG. 7.

As a result, the vertices V102 and V103 move such that the muscle rises influenced by the movement of the model M4, and the vertex V113 moves interlocking with the movement of the model M4. The vertices V101 and V107 simply move interlocking with the movement of the model M1 respectively, and the vertices V104, V105 and V108–V111 move to respective positions influenced by the movement of the models M2 and M3. Therefore the polygon formed by the vertices V104, V109 and V110 changes to a natural elbow joint shape when an arm is bent. The vertex V112 moves interlocking with the movement of the model M3. Each vertex of the model M5 simply moves according to the movement of the model M5 respectively.

When polygons filling the space between each vertex are rendered with respect to the positions of the vertices after movement, the upper arm 3 is lowered in the vertical direction, the lower arm 4 is bent to be in a more horizontal direction, the muscle 3A of the upper arm rises, and the hand part 2 is connected at the tip of the arm, as shown in FIG. 1B. The models M2, M3 and M4 which do not have polygons have no actual vertices, and these models are not displayed in the images.

Figure 9:
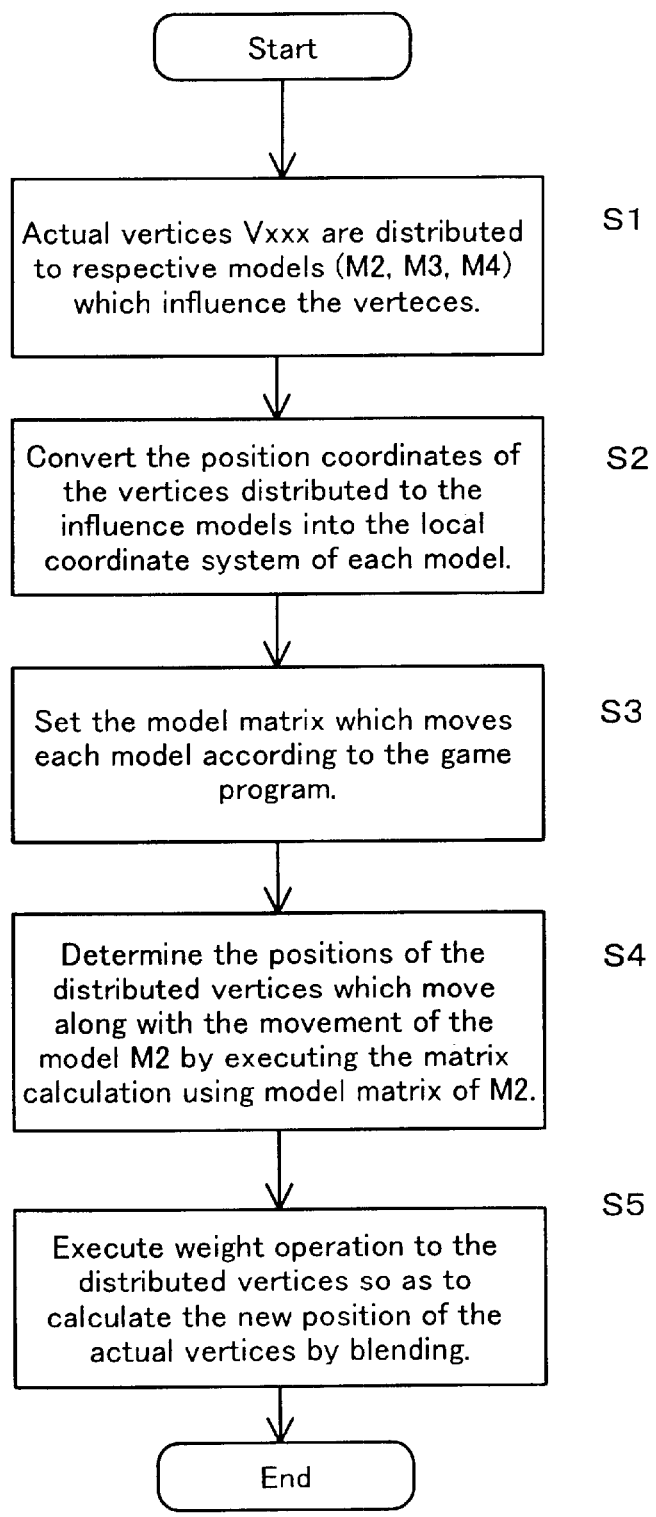
FIG. 9 is a flow chart depicting the procedure of model movement calculation and the weight calculation of vertices in an integrated shaping model.

FIG. 8 is a drawing depicting the weight calculation method in an integrated shaping model. FIG. 8 shows the case when the integrated shaping model in the basic form state in FIG. 4 becomes the state after the movement in FIG. 7, particularly showing the relationship between the vertices V102 and V103 and the models M2, M3 and M4 which influence the vertices V102 and V103. FIG. 9 is a flow chart depicting the procedure of the model movement calculation (matrix calculation) and the weight calculation of vertices in an integrated shaping model.

FIG. 8A shows the models M2, M3 and M4 in the basic form state. As mentioned above, the models M2, M3 and M4 have the local coordinate system CDM2, CDM3 and CDM4 respectively. The global coordinate system CDGB, which is common to all the models, is also set. In the integrated shaping model shown in FIG. 4, a designer has set the vertices V102 and V103 so as to be influenced (with weight value) by the models M2, M3 and M4. In other words, the weight values shown in FIG. 6 are set as the initial values in advance. To execute weight calculation, the vertices V102 and V103 are divided respectively into three vertices (distributed vertices) belonging to the models M2, M3 and M4 which influence the vertices respectively, and are distributed to the respective corresponding models (S1 in FIG. 9). For example, the vertex V102 is divided into distributed vertices V102 (M2), V102 (M3) and V102 (M4), which are distributed to the models M2, M3 and M4 which influence the distributed vertices respectively. The vertex V103 is also divided into three distributed vertices which are distributed to the models which influence the distributed vertices respectively.

As a result, the vertices V102 (M2) and V103 (M2) belong to the model M2. In the same way, the vertices V102 (M3) and V103 (M3) belong to the model M3, and V102 (M4) and V103 (M4) belong to the model 4. The position coordinates of the vertices belonging to each model in the basic form state are converted to the local coordinate system of each model (S2 in FIG. 9). For example, the absolute coordinate of the vertex 102 (M2) and the vertex V103 (M2) is converted to the local coordinate system CDM2 of the model M2 according to the model matrix of the model M2. For the other vertices as well, the absolute coordinate is converted to the local coordinate system of the model which the vertices belong to. As a result, each vertex moves together with the model which the vertex belongs to.

FIG. 8B shows a state when each model M2, M3 and M4 moves as shown in FIG. 7 respectively. The movement of each model is controlled by setting the respective model matrix (S3 in FIG. 9). For example, the local coordinate system CDM2 of the model M2 moves to a position according to the rotation, translation and scale of the model matrix of the model M2 with respect to the local coordinate system of the model M1, which is not illustrated. The vertices V102 (M2) and V103 (M2) belonging to the model M2 shift according to the movement of the model M2, while maintaining the positions with respect to the model M2 in the basic form state. In other words, the positions of the vertices V102 (M2) and V103 (M2) do not move in the local coordinate system CDM2 of the model M2. Therefore the positions of the vertices V102 (M2) and V103 (M2) which move along with the movement of the model M2 can also be determined by executing the matrix calculation utilizing the model matrix of the model M2 (S4 in FIG. 9).

The vertices V102 (M3) and V103 (M3) belonging to the model M3 and the vertices V102 (M4) and V103 (M4) belonging to the model M4 also move along with the movement of the respective models, and the positions after the movement can be determined by executing the matrix calculation utilizing the model matrix of the respective models.

When the positions in the global coordinate system are determined for the vertices distributed to each model, for example, the weight operation according to the weight values (degree of influence) which each model has on the vertices is executed (S5 in FIG. 9). According to the weight values in FIG. 6, for example, the weight values from the models M2, M3 and M4 are 30%, 30% and 40% respectively for both vertices. Given this, consider vertex V102 for example, where a new position coordinate of the vertex V102 according to the degree of influence (weight value) from each model is determined by multiplying the vertex coordinate value of the vertex V102 (M2) by 0.3, multiplying the vertex coordinate value of the vertex V102 (M3) by 0.3, multiplying the vertex coordinate value of the vertex V102 (M4) by 0.4, and integrating (adding) these values. In other words, the vertex V102 indicated by the double circles in FIG. 8 (B) is the position of the actual vertex determined from the three distributed vertices V102 (M2), V102 (M3) and V102 (M4) using 30%, 30% and 40% weight values respectively. If the X coordinate values of the three distributed vertices V102 (M2), V102 (M3) and V102 (M4) in the global coordinate system are X2, X3 and X4, then the X coordinate value X102 of the actual vertex V102 shown by the double circle is given by $$X102=0.3*X2+0.3*X3+0.4*X4$$

(* means multiply) This is the weight calculation.

Utilizing the coordinate values and normal line data of the vertices indicated by the double circles after weight calculation, which are determined as above, the rendering of polygons comprised of a plurality of vertices is executed. For example, the color data of pixels in a polygon connected with a plurality of vertices is determined by determining the inner ratio of the pixel coordinates with respect to the vertex coordinates by a raster scan method and executing interpolation using the inner ratio based on the vertex data and texture data. In addition to the above vertex coordinates, normally data on the normal vectors of the vertex is also used. The normal line data at the vertex indicated by the double circles is determined by the weight operation, the same as above, and the calculation of distributed light with respect to the light source is executed using such normal line data. These rendering methods, however, are not the subject of the present invention, where a general rendering method is used.

The above is the method which implements the movement of a character by the integrated shaping model (envelope) utilizing a three dimensional modeler. As explained above, when an integrated shaping model is used, each model must have data on the influential vertices in addition to the actual vertex data of the respective model, and the step to determine the position of each model by operation using the model matrix, the step to determine the positions of the influential vertices using the model matrix, the step to determine the new position and normal line data considering the degree of influence of these vertices by the weight operation, and the step to execute the rendering of the polygons of each model using the vertex, data determined above are required. Processing for the integrated shaping model which involves these steps must be executed in real-time using such hardware as a game machine, which has only simple operation functions and a small memory capacity, unlike a supercomputer.

The present invention uses conversion data, which is obtained by executing a part of the above data processing in advance on the original model data of the integrated shaping model. This conversion data has a format suitable for operation and processing in real-time by the game machine, and such conversion data is recorded in a recording medium for a game machine, e.g. a CD-ROM or game cassette, as character data.

FIG. 10 is a drawing depicting the relationship between the original data on an integrated shaping model and the conversion data for the drawing library in the present embodiment. According to the present embodiment, the original data 100 on the integrated shaping model generated by a three dimensional modeler used for a CG movie is converted to the conversion data 110 for the drawing library by a new converter program to be provided by the present invention. This conversion data 110 does not include data which dynamically changes during the progress of a game, and has a data format optimized for operating the dynamic movement of characters during the progress of a game by the drawing library (drawing processing program) in a recording medium recording a game program to be executed by the game machine. Therefore the conversion data 110 is generated by converting the original data according to the converter program and is stored in a recording medium for games, a CD-ROM for example.

Figure 11:
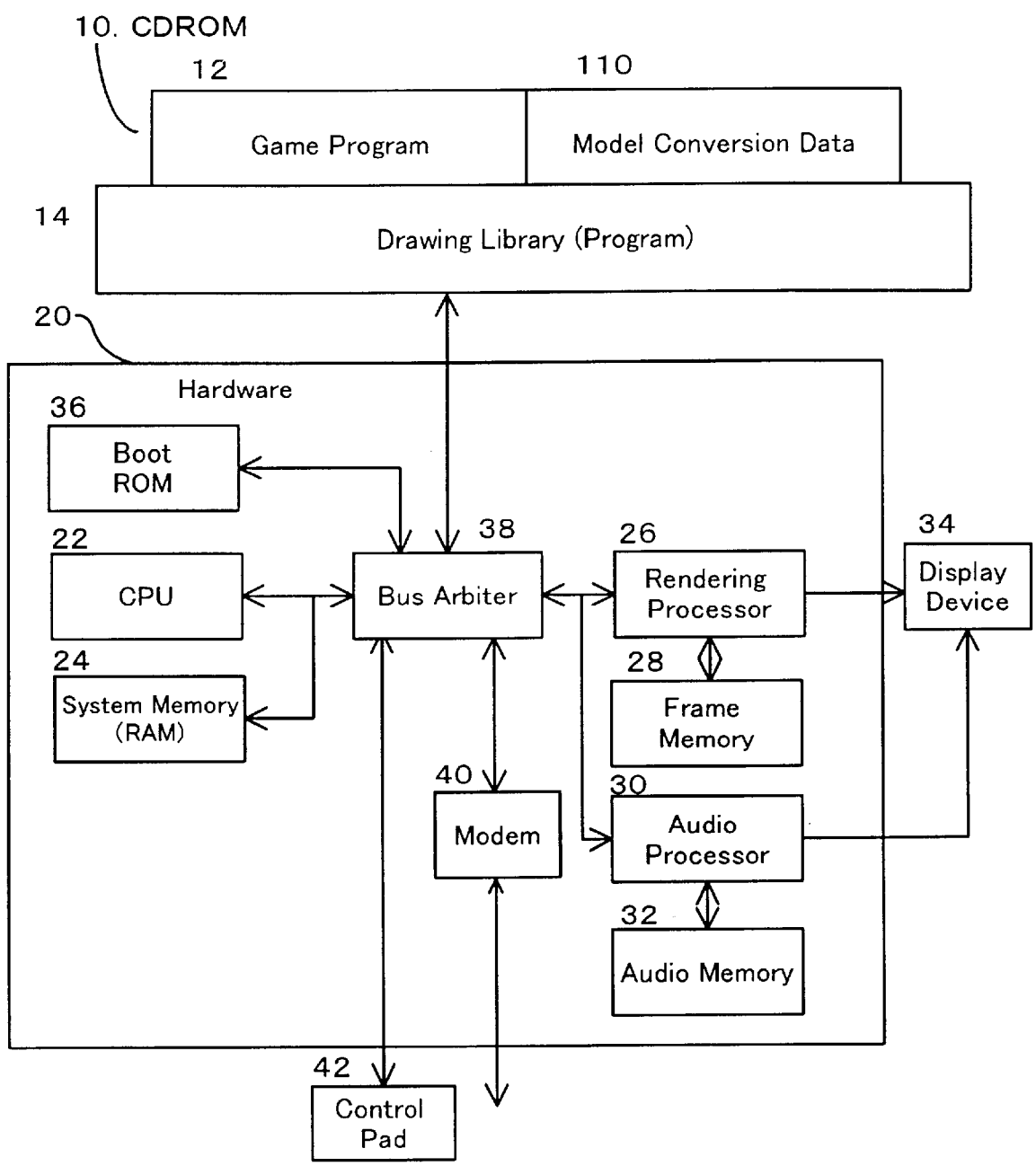
FIG. 11 is a drawing depicting the relationship between the configuration in the recording medium for games and game machine hardware.

FIG. 11 is a drawing depicting the relationship between the configuration in the recording medium for games (e.g. CD-ROM) and game machine hardware. As FIG. 11 shows, the recording medium 10 is for storing a game program 12 which controls the story of the game and movement of the objects, including characters, synchronizing them with the progress of the game, model conversion data 110 which the converter generated by converting original data, and a drawing library (a type of program) 14 for executing image processing. Such a recording medium 10 for games is installed in a game machine hardware 20, and is read when necessary, then the game program is executed, and the drawing library 12 is executed using the model conversion data, and as a result, images in a short time period, at each frame for example, are generated.

FIG. 11 shows a configuration of a game machine hardware 20. CPU 22, for executing arithmetic processing, and system memory (RAM) 24, which temporarily reads the program of the recording medium 10 for games and the model conversion data and is used as a buffer memory of arithmetic processing, are connected via buses in the game machine hardware 20. Also a rendering processor 26, which executes rendering according to the drawing commands generated by the drawing library, a frame memory 28, where the image signals drawn by the processor 26 are recorded, an audio processor 30, for generating audio data, and an audio memory 32, for recording the generated audio data, are connected via a bus arbiter 38. The image data recorded in the frame memory 28 and the audio data recorded in the audio memory 22 are displayed in or output from the display device 34, such as a TV monitor. The bus arbiter 38 in the game machine 20 also has the function of an interface, where the control pad 42 for game inputs is connected as the input means, and an external communication line is connected via a modem 40. The bus arbiter 38 is also connected to a boot ROM 36, so that a boot operation at power ON is executed by executing the data in the boot ROM. The game machine 20 also connects the recording medium 10 for games, e.g. CD-ROM or a game cartridge, via the bus arbiter 38, so as to use the recording medium 10 as an external recording device.

The model conversion data 110 recorded in the recording medium 10 for games has been converted to a data format which decreases the image processing load on the drawing library 14. Because of this data format, which is described later, the model conversion data 110 has an optimum data structure for the drawing library 14, therefore image processing for the integrated shaping models of characters which move during the progress of a game can be executed in real-time.

Figure 2:
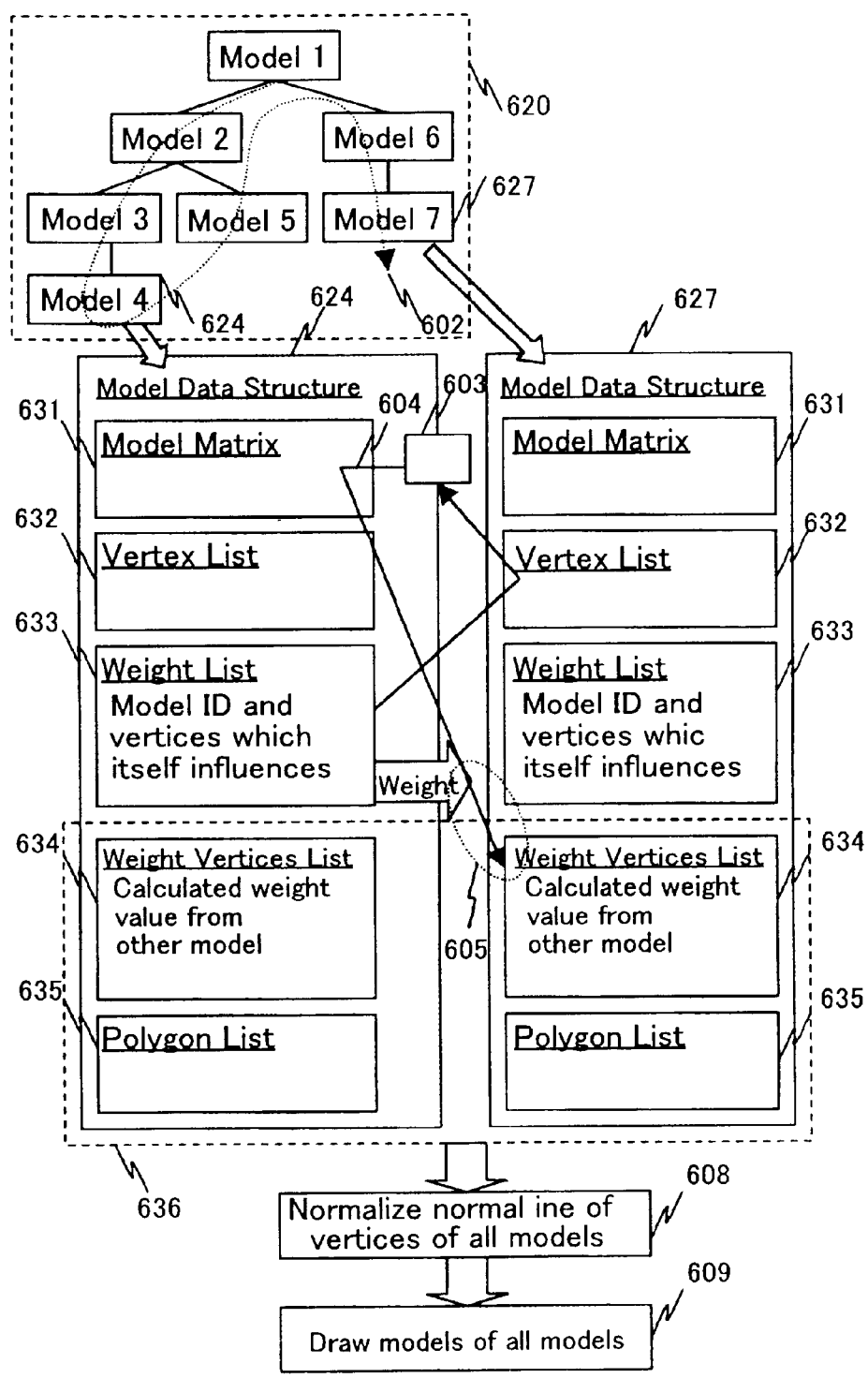
FIG. 2 is a drawing depicting conventional image processing utilizing an integrated shaping model in CG movies.
Figure 3:
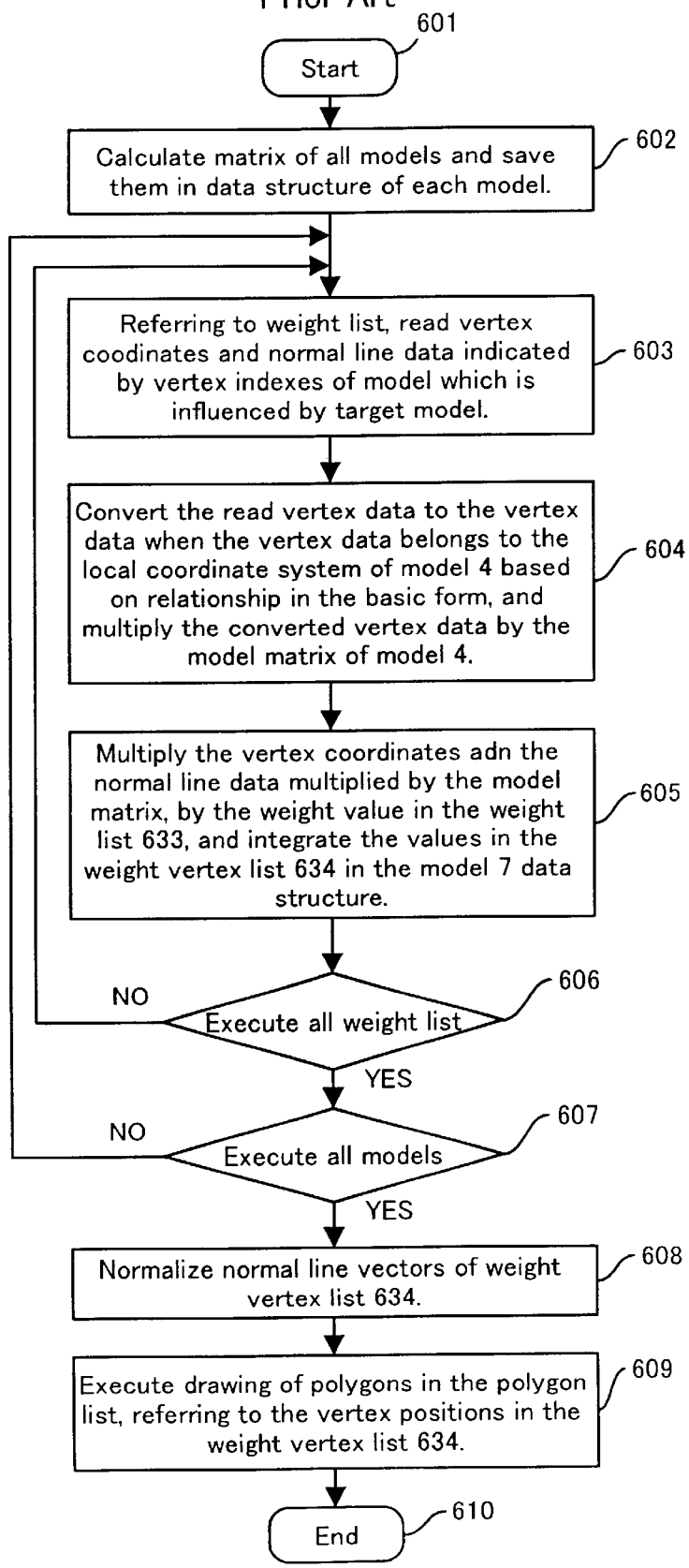
FIG. 3 is a flow chart depicting the image processing procedure in FIG. 2.
Figure 12:
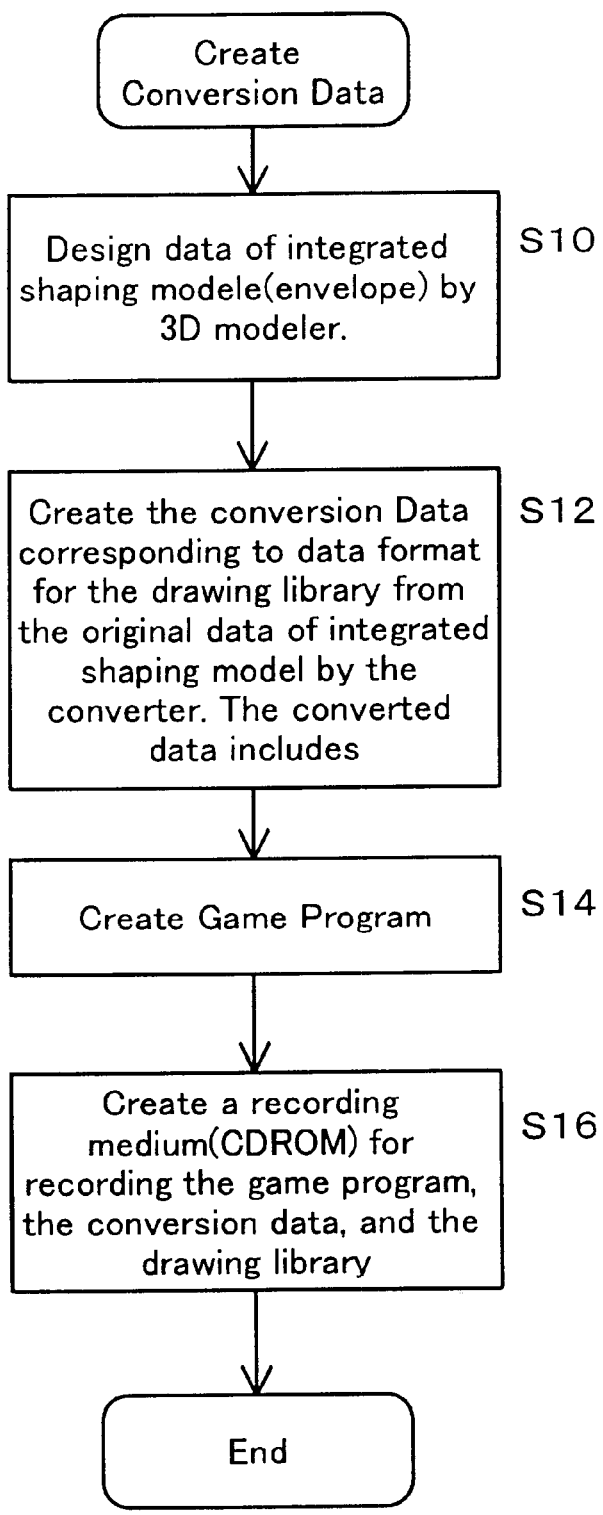
FIG. 12 is a flow chart depicting the processes of creating conversion data from the integrated shaping model data by a three dimensional modeler.

FIG. 12 is a flow chart depicting the processes of creating conversion data from the integrated shaping model data by a three dimensional modeler. The game is normally created by a planner who creates the game story, a designer who designs game objects, such as characters, for the game, and a programmer who writes the game program. The three dimensional modeler is used by the designer to provide characters which move as naturally as possible, and generates original data of the integrated shaping model called an envelope (S10). In this integrated shaping model, as explained above, each model has a model matrix, vertex data and weight list, as shown in the prior art in FIG. 2. The model matrix is matrix data on rotation, translation and scale with respect to a model in the higher hierarchy in the hierarchical structure (tree structure) of the models. The vertex data is data corresponding to actual vertices, and includes at least the position coordinate data and normal line data on the normal line vectors of the vertices. The vertex data also includes a value indicating opacity and texture coordinates which correspond to texture data, for example. The weight list has at least the IDs of the actual vertices which the model influences (model ID and vertex IDs of vertices belonging to the model) and weight values. FIG. 6 shows the data when the weight list is developed.

Then the conversion data corresponding to the data format for the drawing library is generated from the original data of the integrated shaping model by the converter program (S12). In the conversion data, about which details are explained later, actual vertices are divided into four groups, that is, native vertices, which do not have weight, and start weight vertices, middle weight vertices, and end weight vertices, which require weight calculation. The start weight vertex is a vertex for which the weight value is multiplied first in the weight calculation, the middle weight vertex is a vertex for which the weight value is multiplied next in the weight calculation, and the end weight vertex is a vertex for which the weight value is multiplied last in the weight calculation. The sequence of weight calculation is normally determined according to the tracing sequence of the hierarchical structure (tree structure) of the models. The vertices divided into each group are sorted for each model where respective vertices belong.

Then the format of the common vertex buffer comprised of native vertices and start weight vertices, which denote actual vertices without overlapping, is generated, and consistent vertex IDs are assigned to the actual vertices arranged in the common vertex buffer regardless the attribute of the model. The list of the actual vertices comprised of native vertices and the start weight vertices in the common vertex buffer is a set of the actual vertices for each model where the actual vertices belong. The common vertex list for each model is sorted for each model which influences those actual vertices, and is sorted in the sequence for each model. The consistent vertex IDs are assigned to the actual vertex list for each model arranged in the common vertex buffer, so as to simplify the reference procedure in the weight calculation at a later step. The common vertex buffer generated in this manner has a simple data structure equivalent to the conventional actual vertex list of a model which does not involve weight calculation.

In addition to the format of the common vertex buffer, the vertices divided into four groups are distributed to the models which influence these vertices. And a vertex list comprised of the distributed vertices is generated for each model. In this vertex list, the vertices are sorted into the above four groups, native, start weight, middle weight and end weight, where the vertices are saved. The vertex data in the vertex list includes the vertex coordinate data based on the local coordinates in the model, normal line data and weight data, which refers to the vertex IDs in the common vertex buffer of the influential actual vertices if necessary. In other words, the above weight data is included in the vertex data belonging to the start weight, middle weight and end weight vertices, and is not included in the vertex data belong to the native vertices.

In this vertex list for each model, the native vertices, on which only the model influences (one weight), and the start weight vertices, middle weight vertices and end weight vertices, on which the model and other models influence (multi-weight), are unitarily arranged. The drawing library executes image processing in real-time using the vertex list and the common vertex buffer.

The model conversion data also includes the polygon list. This polygon list has a plurality of vertex data constituting the polygon. The vertex ID assigned to the actual vertices in the common vertex buffer is used as attribute data in the vertex data of the polygon list. Preferably the polygon list also includes a drawing command to indicate whether rendering (drawing) of the model is executed. This drawing command is generated by the converter and is referred to by the drawing library.

As described above, the conversion data 110 generated by the converter has the format of the common vertex buffer indicating the list of the actual vertices, a vertex list of the vertices distributed to each model, and the polygon list of each model. As FIG. 9 shows, the conversion procedure by the converter includes the distribution of actual vertices to the model (S1) and conversions to the local coordinate system in the model (S2), then the movement calculation based on the model matrix (matrix operation) which is executed by the drawing library (S3, S4), and the generation of optimum conversion data for the weight operation using the weight values (S5), are executed. This conversion data will be described again later using the examples in FIG. 4 and FIG. 7.

Along with the generation of the conversion data 110, the game program is created by a programmer (S14), as mentioned above. And as shown in FIG. 11, the game program 12, the model conversion data 110 and the drawing library 14 are recorded in the recording medium 10 for games (S16).

Figure 13:
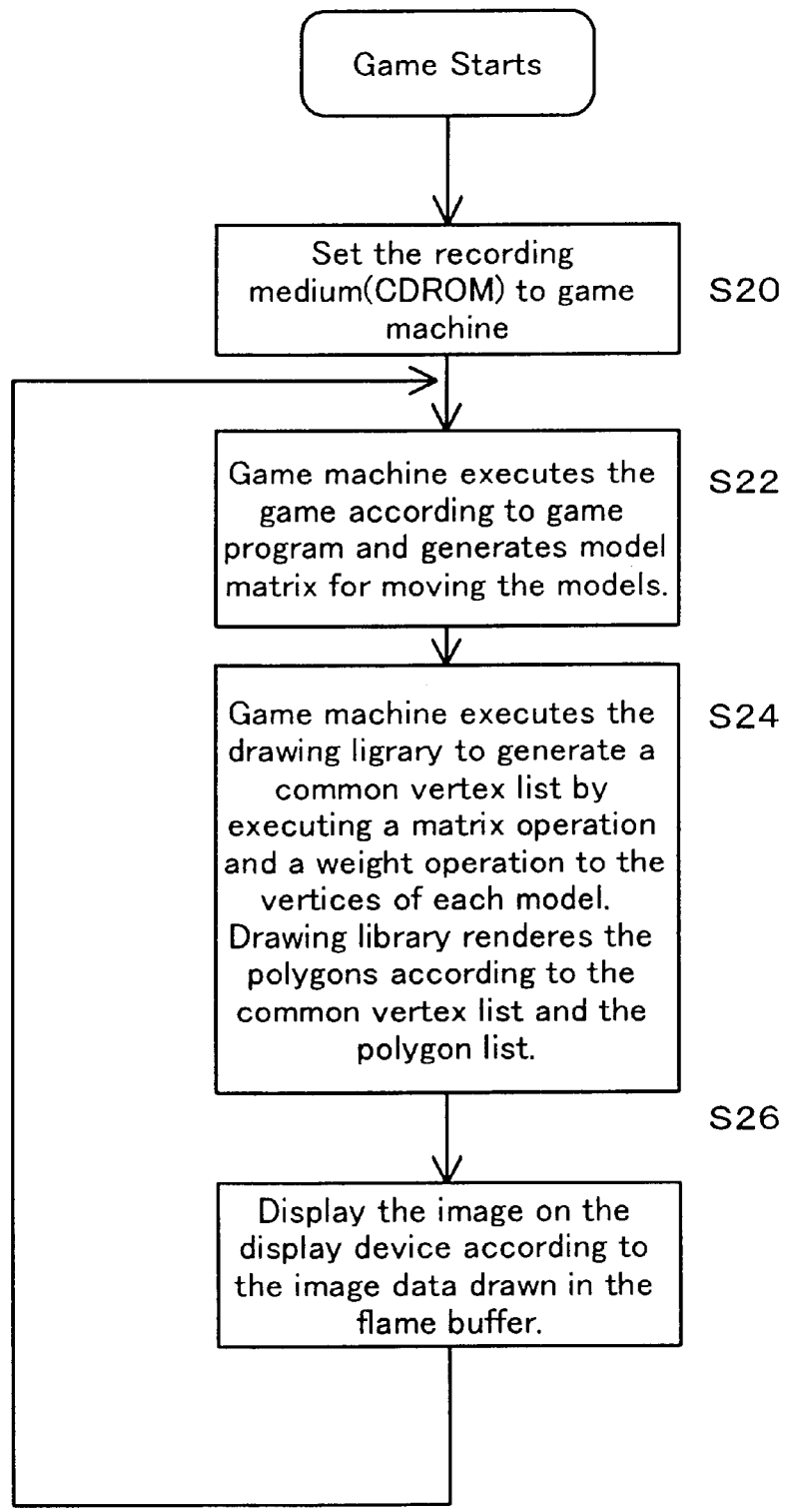
FIG. 13 is a flow chart in a game.

FIG. 13 is a flowchart of a game. To play a game, a recording medium 10 for games is set to the game machine (S20). The game machine executes the game according to the game program in the recording medium, and generates a model matrix for moving the models which constitute a character (S22). The model matrix for movement is a matrix comprised of such parameters as rotation, translation and scale with respect to the model in the higher hierarchy, as mentioned above, and new coordinates after movement are determined by multiplying the model or the vertex coordinates of the polygon by the model matrix.

Then the game machine executes the drawing library (S24). The model conversion data 110 has a format of the common vertex buffer where consistent IDs are assigned for the actual vertices of all models, a vertex list of vertices distributed for each model, and a polygon list for each model. The vertex list for each model comprised of vertices which are not influenced by other models (native vertices) and vertices which are influenced by other models (start weight, middle weight, and end weight), as described later, where the vertices which are influenced by other models, are sorted for each one of the other influential models. The vertex list for each model uses the vertex IDs of other influential vertices according to the consistent vertex IDs in the common vertex buffer. The polygon list for each model includes vertex data, where the vertex IDs of the polygons constituting the model are attribute data, and includes a drawing command for the model for which the weight calculation has ended, and an non-drawing command for the model for which the weight calculation has not ended. The common vertex buffer is developed in the system memory (RAM) in the game machine at the stage when the drawing library executes image processing.

In the procedure for the drawing library, new coordinate data of vertices after movement is determined by multiplying the coordinate data of the vertices of each model by the matrix for movement created by the game program. This step corresponds to Step S4 in FIG. 9. Then based on the vertex data, the weight calculation is executed according to the tracing sequence of the hierarchical structure of the model and in the sequence of the vertex list in the model, and the calculation result is written or integrated (added) to the area in the common vertex buffer corresponding to the influential vertices. This step corresponds to Step S5 in FIG. 9. Then the drawing library executes the drawing (rendering) of the polygons in the model referring to the vertex coordinates and normal line data stored in the common vertex buffer according to the drawing command in the polygon list in each model, and records the image data, including color data of the pixels in the polygons, in the frame buffer 28.

The images are displayed on the display device 34 according to the image data drawn in the frame buffer 26 (S26). By displaying these drawn images for each frame, images, including characters which move responding to the control input signals of the operator, can be displayed. Since a model based on the integrated shaping model generated by a three dimensional modeler is used, the joint part of characters move naturally, and such movement as the rise of a muscle of a character can be expressed. The above Steps S20–S26 are repeated for each frame period.

Figure 14:
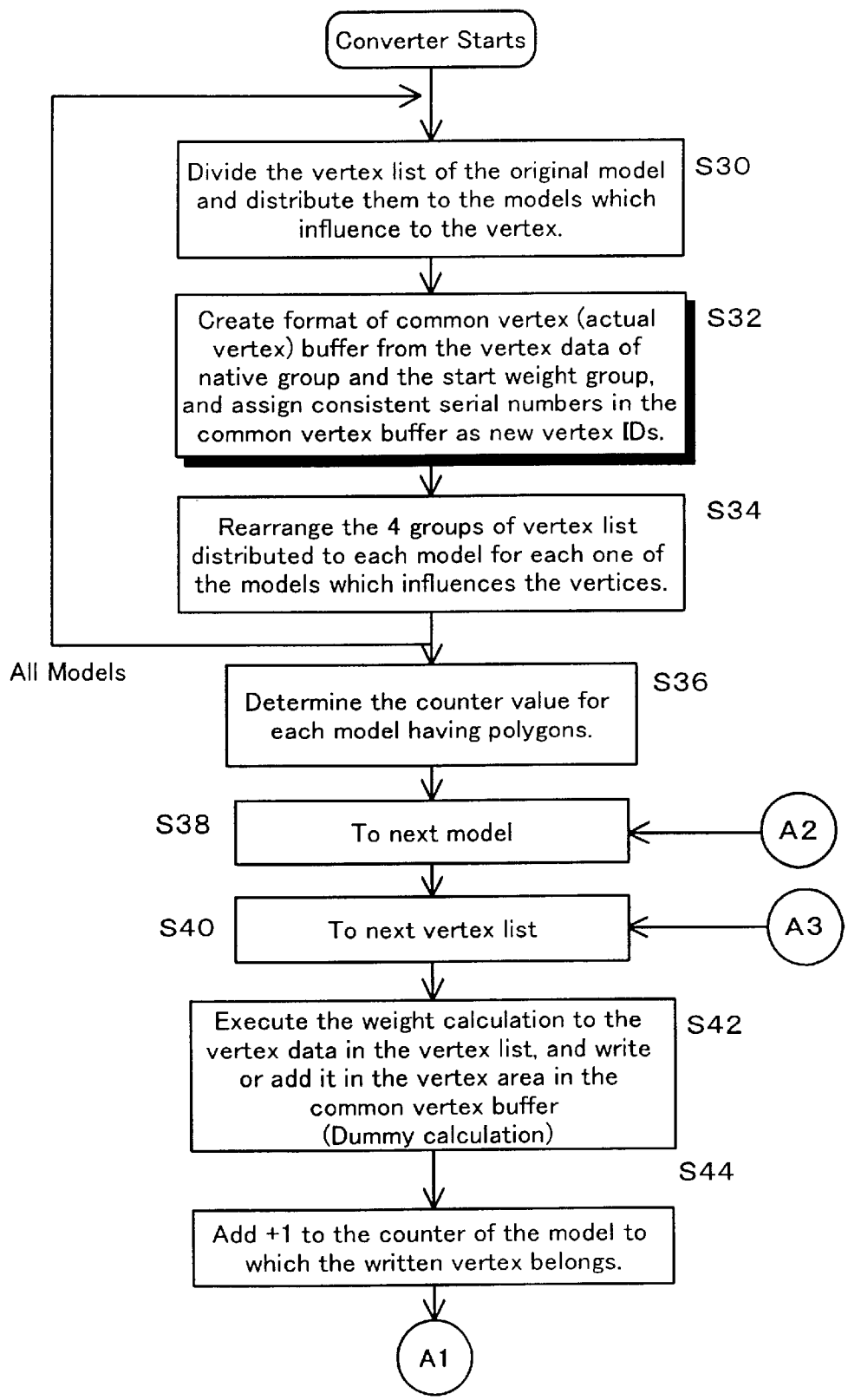
FIG. 14 is a flow chart depicting a procedure of a converter.
Figure 15:
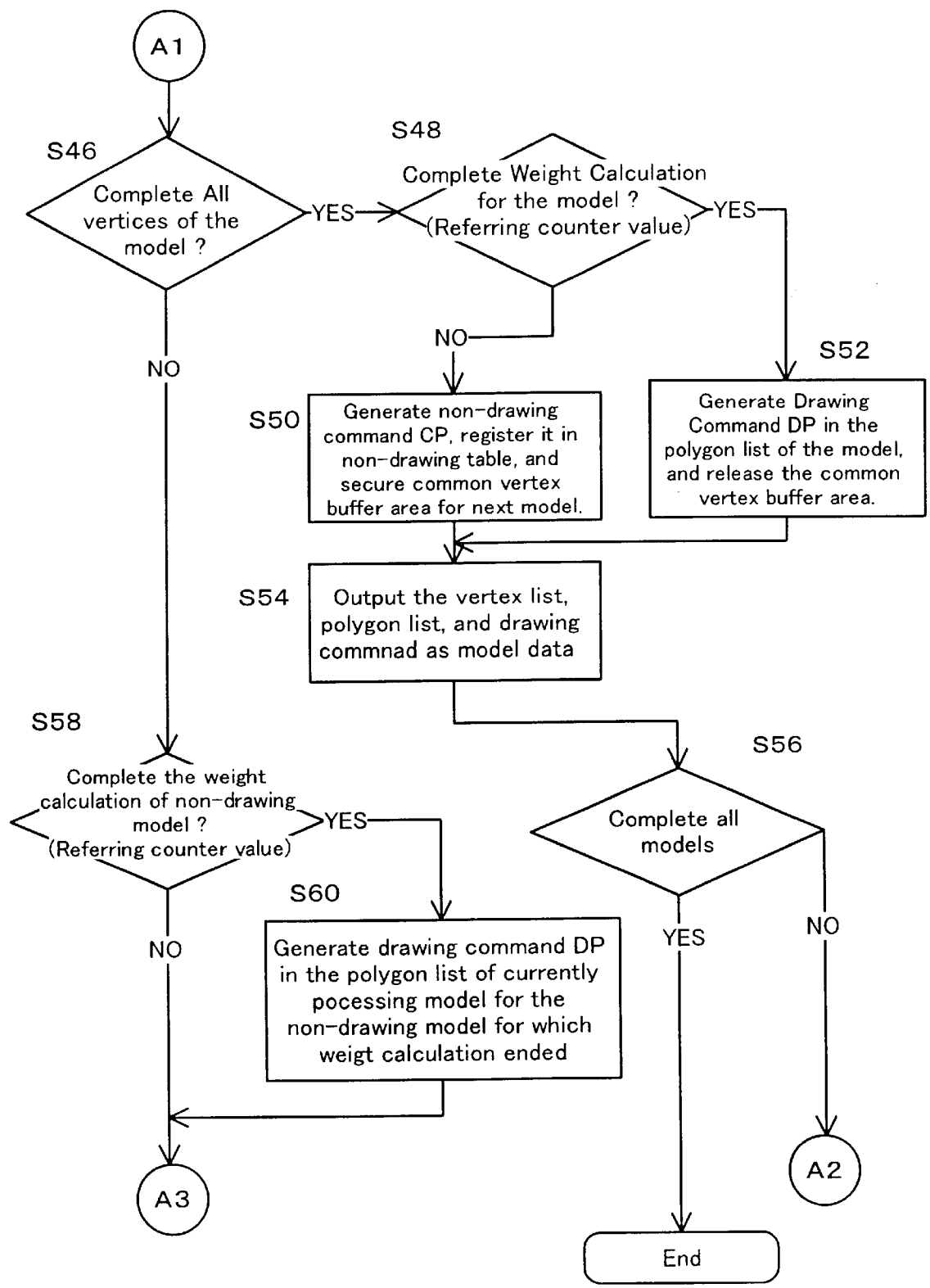
FIG. 15 is a flow chart depicting a procedure of a converter.

FIG. 14 and FIG. 15 are a flow chart depicting procedures of the converter. Unlike the drawing command stored in the recording medium for games, the converter of the present embodiment is not required to process data in real-time. The steps S30, S32 and S33 of this flow chart are the stages to create the format of the common vertex buffer from the original data of the model, and to create the vertex list for each model. The steps S36–S60 of this flow chart are simulation operation stages of image processing which the drawing library executes, and executing this simulation operation makes it possible to detect the timing to execute the drawing (rendering) of each model when the hierarchical structure of the models is traced, and to insert the non-drawing command and drawing command in the polygon list of the model. The format of the common vertex buffer and the vertex list created in this manner have a data format suitable for the drawing library to execute image processing, and the non-drawing command or the polygon list with a drawing command, which are generated by the simulation operation, decreases the burden of the drawing library to manage the drawing timing of each model.

The converter program having the processing procedure shown in FIG. 14 is executed by a general purpose computer which has faster processing functions and larger capacity memory than a game machine. The converter program is recorded in an external recording medium, such as a hard disk, of this general purpose computer, by which the processing procedure is executed for the original data and the conversion data is generated.

In order to execute the movement calculation (matrix calculation) and weight calculation for drawing of the integrated shaping model, as explained in FIG. 9, it is necessary to distribute the actual vertices to the influential models (S1), and to convert the position coordinate data and normal line data of the vertices into the local coordinate system of the distribution destination model (S2). In addition to the above two procedures S1 and S2, the converter of the present embodiment generates the actual vertices for the number of the distribution destination models, and divides these actual vertices into four groups, native vertices, which depend on the position of a single model (vertices which have no weight) start weight vertices, for which weight calculation must be executed first when the model hierarchy is traced, middle weight vertices, for which weight calculation must be executed second or later, and end weight vertices, for which weight calculation must be executed last (the start weight vertices, middle weight vertices and end weight vertices are vertices which are influenced by a plurality of models (vertices which have weight)) (S30).

Since the native vertices and start vertices, of the four groups of vertices, correspond to the actual vertices, the converter rearranges the vertices of these vertex groups for each model to which the vertices belong, and creates the format of the common vertex buffer (S32). To these vertices which are arranged in the common vertex buffer, consistent serial numbers are assigned as new vertex IDs. A number in various formats can be used for a new vertex ID. For example, an entry number of the vertex in each model and an offset value corresponding to the number of vertices in the model are used so that the format data of the common vertex buffer can be created, and also the number can be used for the vertex ID.

The converter also rearranges the four groups of vertices distributed to the models for each one of the models which influences these vertices, and creates the vertex list for each model (S34).

Figure 16:
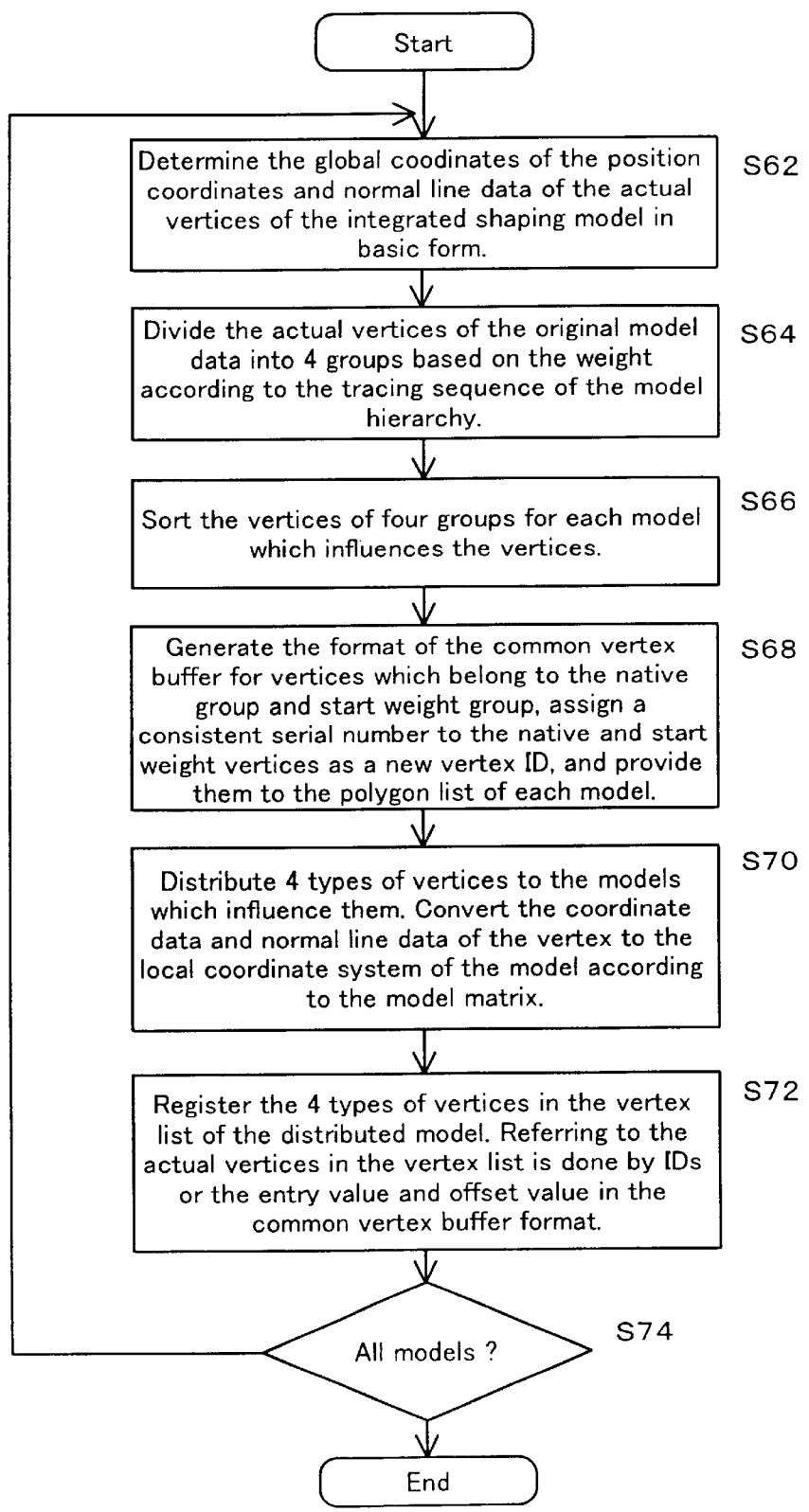
FIG. 16 is a flow chart depicting a procedure of the detailed distribution of actual vertices to models and vertex list generation.
Figure 17:
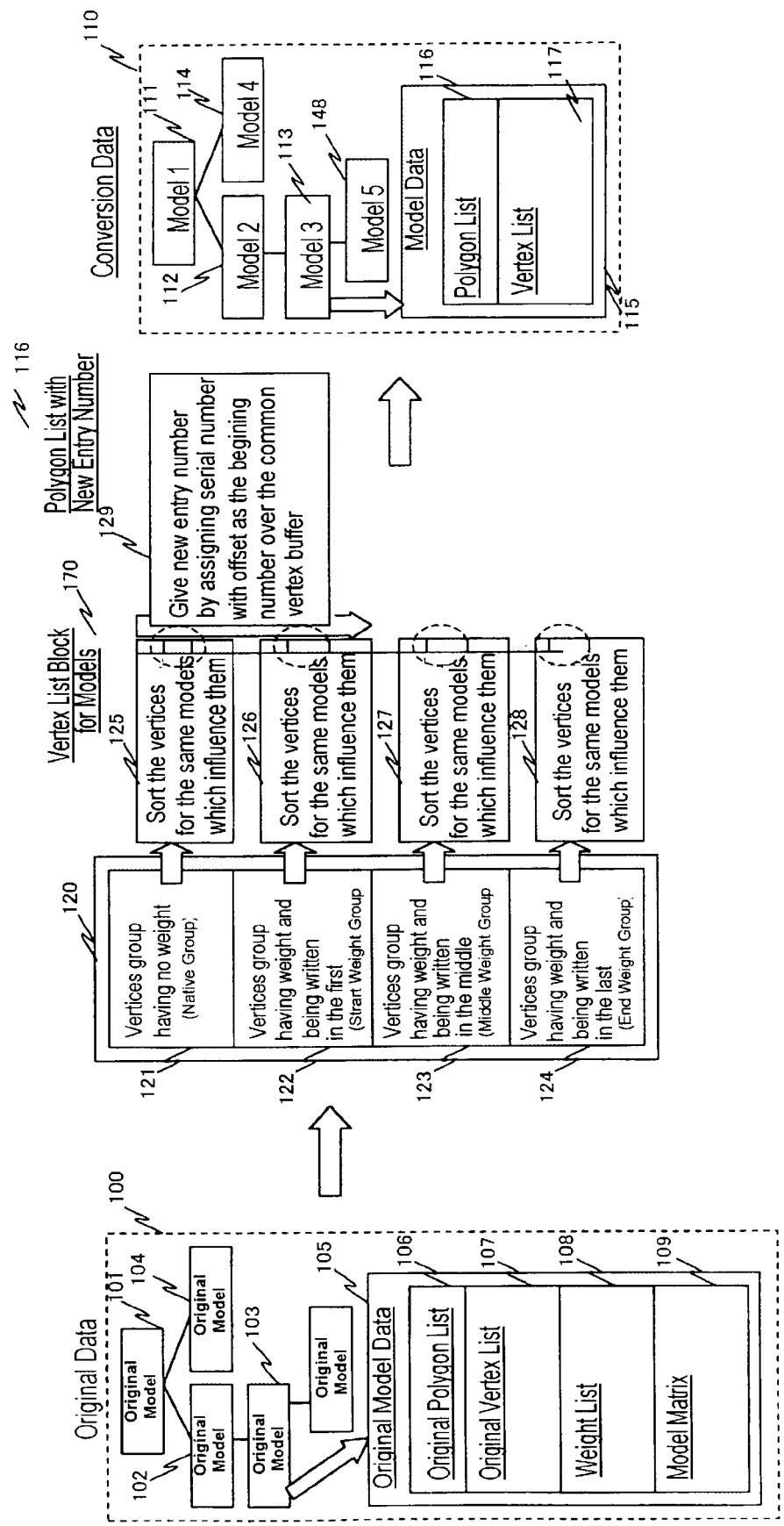
FIG. 17 is a drawing depicting a procedure to convert the original data to the conversion data.
Figure 18:
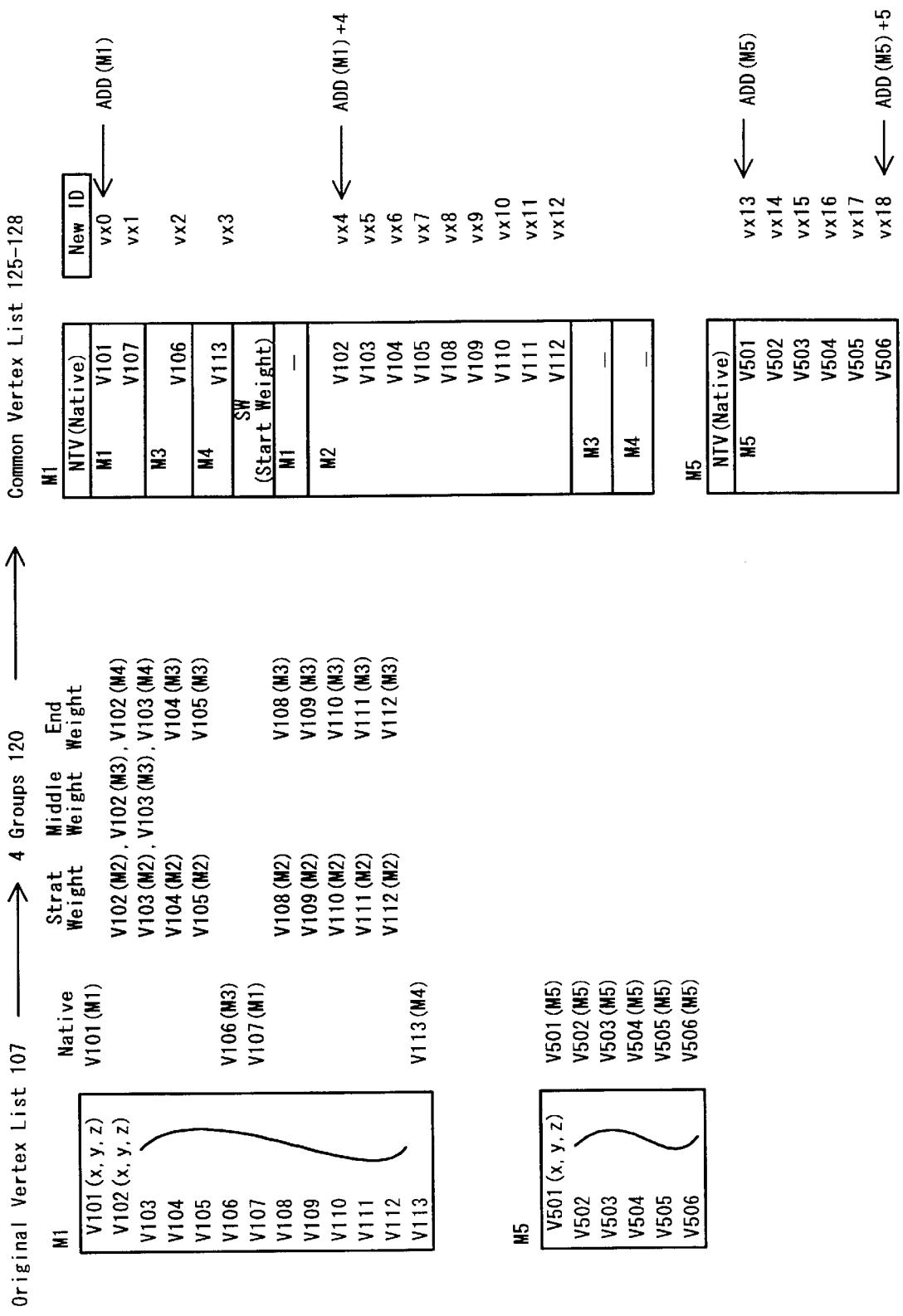
FIG. 18 is a drawing depicting the vertex list of the original data and the common vertex list when the present invention is applied to a specific model example.
Figure 19:
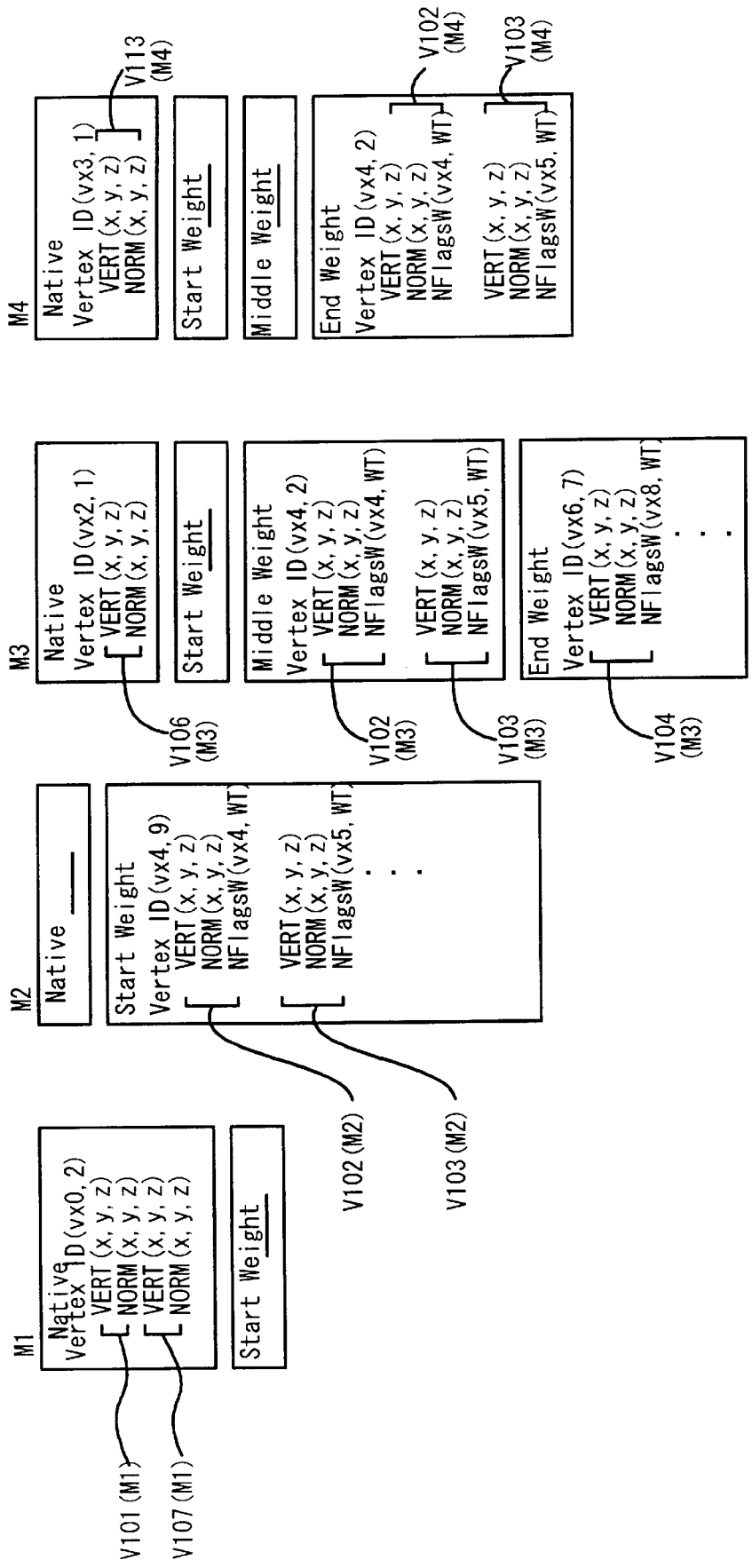
FIG. 19 is a drawing depicting a vertex list when the present invention is applied to a specific model example.

The above memory processings S30, S32 and S34 will be explained below using the model examples in FIG. 4 and FIG. 6. FIG. 16 is a flow chart depicting the procedure of the detailed distribution of actual vertices to models and the vertex list generation. FIG. 17 is a drawing depicting procedure to convert original data to conversion data. FIG. 18 is a drawing depicting a vertex list of the original data and a common vertex list when the present embodiment is applied to a specific model example, and FIG. 19 is a drawing depicting a vertex list when the present embodiment is applied to a specific model example. The procedure shown in FIG. 16 and FIG. 17 will now be described with reference to FIG. 18 and FIG. 19.

As the left side of FIG. 17 or the left side of FIG. 18 shows, the data on the models M1 and M5 of the original data includes the vertex list (107 in FIG. 17). This model data of the original data is data generated by a three dimensional modeler, where each model has the model matrix (109 in FIG. 17), a model having a polygon has the vertex list (107 in FIG. 17), and the polygon list (106 in FIG. 17), and a model which influences the vertices has the weight list (108 in FIG. 17). The original vertex lists at the left side of FIG. 18 correspond to the vertex lists of the models M1 and M5, which are the above mentioned models having polygons. Therefore the vertices shown here are actual vertices and the vertex list includes at least the position coordinate data and normal line data on the vertices.

At first, the converter determines the global coordinates of the position coordinates and normal line data of the actual vertices of the integrated shaping model in basic form (S62). This operation is executed, for example, by multiplying the actual vertex data of respective models by the model matrix of the models M1 and M5. As a result, the data on the actual vertices V101–V113 and V501–V506 shown in FIG. 4 are converted to the global coordinate system.

Then the actual vertices of the original model data are divided into four groups based on the weight according to the tracing sequence of the model hierarchy (S62, see Steps 121–124 in FIG. 17). In FIG. 18, for example, the tracing sequence in the model hierarchy is the models M1, M2, M3, M5 and M4. The vertex V101 of the model M1 is a vertex which depends 100% on the position of the model M1 and belongs to the native vertex group which has no weight and does not require the weight calculation. The vertex V102 of the model M1 is indicated in the weight table in FIG. 6, and is influenced by the models M2, M3 and M4 for 30%, 30% and 40% respectively, as shown in FIG. 8, so the vertex V102 (M2), which is influenced by the model M2, is sorted to the start weight group, the vertex V102 (M3), which is influenced by the model M3, is sorted to the middle weight group, and the vertex V102 (M4), which is influenced by the model M4, is sorted to the end weight group.

For the vertex V103 of the model M1 as well, the vertex V103 (M2), which is influenced by the model M2, is sorted to the start weight group, the vertex V103 (M3), which is influenced by the model M3, is sorted to the middle weight group, and the vertex V103 (M4), which is influenced by the model M4, is sorted to the end weight group. For the vertex V104 of the model M1, the vertex V104 (M2), which is influenced by the model M2, is sorted to the start weight group, and the vertex V104 (M3), which is influenced by the model M3, is sorted to the end weight group. As FIG. 18 shows, the vertices V105, and V108–V112 are also sorted to the start weight group and the end weight group.

As FIG. 18 shows, the vertex V106 of the model M1, which is influenced 100% by the model M3, is sorted to the native group, the vertex V107 is influenced 100% by the model M1 and the vertex V113 is influenced 100% by the model M4, therefore the vertex V107 (M1) and the vertex V113 (M4) are sorted to the native group.

The actual vertices V501–V506 of the model M5 all depend on the position of the model M5 without receiving weight from other models, therefore the vertices V501 (M5)–V506 (M5) are sorted to the native group respectively, and are distributed to the model M5. In this way the actual vertices are sorted into four vertex groups. Then the converter sorts the vertices in the above four groups for each model which influences these vertices (S66, Steps 125–128 in FIG. 17). In the case of the example in FIG. 18, for example, the four vertices V101 (M1), V106 (M3), V107 (M1) and V113 (M4), which belong to the native group of the model M1, are sorted for each one of the models M1, M3 and M4 which influence these vertices, and are rearranged in the sequence of V101 (M1), V107 (M1), V106 (M3) and V113 (M4), for example. The nine vertices V102 (M2) –V105 (M2) and V108 (M2)–V112 (M2), which belong to the start weight group of the model M1, remain in this sequence since these vertices are all influenced by the model M2. The two vertices V102 (M3) and V103 (M3), which belong to the middle weight group of the model M1, remain in this sequence. And the nine vertices V102 (M4), V103 (M4), V104 (M3), V105 (M3) and V108 (M3)–V112 (M3), which belong to the end weight group, are rearranged for each one of the models M3 and M4 which influence these vertices. The six vertices of the model M5 remain in the same sequence since these vertices are all influenced by the model M5.

Then the converter generates the format of the common vertex buffer for the vertices which belong to the native group and the start weight group out of the above four groups (S68, Step 129 in FIG. 17). This common vertex buffer is actually a buffer to store the actual vertex list, where, at first, the actual vertices are grouped for each model to which the vertices belong, then the vertices are grouped for each native group and start weight group, and finally the vertices are grouped for each model which influence these vertices.

In the case of the example in FIG. 18, the list in the common vertex buffer for the model M1 has vertices V101 and V107 for the influential model M1, the vertex V106 for the model M3, and the vertex V113 of the model M4 in the native group. In the start weight group, the list has nine vertices V102–V112 for the influential model M2. In the start weight group, no vertices for the model M1, M3 and M4 exist.

For new vertex IDs, new serial numbers vx0–vx12 are assigned to the vertices allocated in the common vertex buffer. To assign a vertex ID, as described in Step 129 in FIG. 17, a serial number which starts with an offset value comprised of the number of vertices of each model in the common vertex buffer can be used as an entry number. In the case of the model M1, for example, the first address becomes ADD (M1), and for the area of the vertex V102, ADD (M1)+4 is set as the vertex ID, which indicates that the vertex V102 is the fifth entry number from the first address ADD (M1). Since the number of vertices in the model M1 is 13, the offset value of the model M1 is 13. Therefore, the offset value 13 of the model M1 is used for the first address ADD (M5) of the next model, model M5, and entry numbers 0–6, starting with the first address ADD (5), are assigned to the common vertices of the model M5.

By using an offset value and entry number in this manner, an address indicating an area of each vertex in the buffer within the memory area can be easily set when the common vertex list of each model is stored in the buffer. This matter will be explained in detail later. Such an offset value and entry number become the format information of the common vertex buffer.

The above mentioned common vertex list is actually the same as the actual vertex list of each model, and by storing this list in memory and creating the common vertex buffer, the integration (addition) of the multiplied value of the weight values and coordinate or normal line data in the weight operation can be executed for the common vertex buffer. Also by assigning a new vertex ID to each vertex and by using this vertex ID in the later mentioned vertex list and polygon list, the reference ID of vertices used during operation by the drawing library can be simplified.

Since new vertex IDs are assigned, the vertex IDs in the polygon list, which each model has, are converted to the new vertex IDs as well (S68). By this conversion, the reference of data in the common vertex buffer, when the drawing (rendering) of polygons is executed after the weight operation of the models ends, can be simplified, and the speed of the drawing step (rendering step) by the drawing library, where real-time processing is demanded, can be increased.

As explained in FIG. 8, each one of the generated vertices must be distributed to the models which influence the vertex. Therefore the converter distributes the four types of vertices to the models which influence the vertices respectively (S70). Distribution here means listing the vertex in the vertex list in the model which influences the vertex, and converting the coordinate data and normal line data of the vertex to the local coordinate system of the model. Conversion to the local coordinate system is executed by multiplying data on each vertex on the global coordinate system, determined in Step S62, by the reverse matrix of the model matrix which indicates the position of the model.

The converter registers the above mentioned distributed vertices in the vertex list of the distribution destination model (S72). This vertex list is created for each one of the four groups. For the reference IDs of the registered vertices, new vertex IDs (e.g. an offset value and entry number) are used according to the format of the common vertex buffer. As a result, accessing an area of the common vertex buffer where an operation result is stored can be easier when the weight operation is executed for a vertex in the vertex list.

In the case of the examples of FIG. 18 and FIG. 19, the vertices in four groups in FIG. 18 are distributed to the vertex lists of the models which influence the vertices, that is, the models shown in parentheses in the drawings (e.g. the model M1 in the case of V101 (M1)). As a result, the vertex list shown in FIG. 19 is created for each model. In the vertex list of the model M1, for example, the coordinate data VERT and the normal line data NORM of the vertex V101 (M1) and V107 (M1), which belong to the native group, are arranged. The respective reference ID of a vertex is denoted by "vertex ID (vx0, 2)". That is, "vertex ID (vx0, 2)" indicates two vertex areas in the area where the vertex ID in the common vertex buffer in FIG. 18 is vx0. Another way of assigning a reference ID is, for example, assigning new vertex IDs, vx0 and vx1, to the vertex data in the vertex list as attribute data.

As the example in FIG. 19 shows, the vertex list of the model M2 has no vertices belonging to the native group, and has nine vertices belonging to the start weight group. In the case of a vertex belonging to the start weight group, the vertex data includes weight data NFlagsW, which has the weight value WT and the IDs of the actual vertices to be stored (vx4 and vx5 in the case of the example in FIG. 19), in addition to the coordinate data VERT and the normal line data NORM. This actual vertex ID is defined by the offset value of each vertex block of the common vertex buffer and the entry number of that block, as shown in FIG. 18. Therefore in the weight data NFlagsW, the entry value can be used as the vertex ID.

The vertex list of the model M3 shown in FIG. 19 includes the vertex data on the vertex V106 (M3), which belongs to the native group, vertex data (coordinate data, normal line data and weight data) on the vertices V102 (M3) and V103 (M3), which belong to the middle weight group, and vertex data (coordinate data, normal line data and weight data) on the seven vertices, which belong to the end weight group. The vertex list of the model M4 includes one vertex, V113 (M4), which belongs to the native group and two vertices, V102 (M4), V103 (M4), which belong to the end weight group.

When the above steps S62–S72 are executed for all the models, the polygon list 116 based on the new vertex IDs and the vertex list 117 divided into four groups are generated as respective model data 115, as shown in FIG. 17. An example is shown in FIG. 19. Also the common vertex list shown in FIG. 18 is generated, and format information (e.g. offset value and entry number) of the corresponding common vertex buffer is generated. As a result, the drawing library can create the common vertex buffer to store the data on the actual vertices, can execute the operation for native vertices, the operation for start weight vertices, the operation for middle weight vertices, and the operation for end weight vertices sequentially according to the vertex list distributed to each model, and can draw polygons by referring to the polygon list based on the new vertex IDs and by utilizing the vertex data, after the weight operation, written in the common vertex buffer.

In addition to the creation of the format information of the common vertex buffer and the vertex list and polygon list for each model, as shown in FIG. 14, the converter simulates the drawing (rendering) timing of each model and adds a drawing command or non-drawing command to the polygon list. For this, the converter detects the timing when the weight calculation for the vertices which influence the actual vertices in the model ends.

To detect the timing, the converter determines the counter value which indicates the number of times the weight calculation is executed for each model having polygons (S36). This counter value is equal to the number of vertices divided into four groups in each model. That is, the counter value of the model M1 is 24, and the counter value for the model M5 is 6. In other words, this counter value indicates the number of times when the drawing library executes writing or integration (addition) in the common vertex buffer, and the end of the weight calculation for the counter value times in each model means that the weight calculation of models which influence the vertices of the model have ended, and also means that the data of the actual vertices is defined, and preparation for drawing (rendering) is ready.

In the drawing simulation by the drawing library, the matrix calculation and the weight calculation are executed sequentially for the vertex data of the vertex list of each model, writing or integration is executed in the vertex area in the common vertex buffer (S42), and the counter of the model where the written or integrated vertices belong is incremented +1 (S44). In the case of the example in FIG. 19, the common buffer area of the model M1 is secured in the memory, and for the vertex list of the model M1, the coordinate data and normal line data at new positions are determined by multiplying the coordinate data VERT and the normal line data NORM of the vertex V101 (M1) by the model matrix of the model M1, then the weight value 1.0 (100%) is multiplied, and this data is written in the area of vx0 in the common vertex buffer shown in FIG. 18. This vertex V101 (M1) is a native group which is influenced 100% by the model M1, so the weight value is 1.0 and data remains unchanged even if the weight value is multiplied. For the vertices of the native group, data may be written in the common vertex buffer without executing weight calculation (multiplication). Then the same calculation is executed for the vertex V107 (M1), and the determined data is written in the vx1 area in the common vertex buffer. As a result, the counter value of the model M1 becomes 2.

The above steps S42 and S44 are repeated in the sequence of the vertex list in each model. And the execution of steps S42 and S44 ends for all the vertices of a model (S46), and whether the weight calculation for that model has ended is judged by judging whether the counter value of the model is the same as the setting (S48). In the case of the model M1 in FIG. 19, for example, the counter value is 2 and has not reached the setting, which is 24, even if the weight calculation for the two vertices, vertex V101 (M1) and vertex V107 (M1), has ended, therefore the drawing of the model M1 cannot be executed. In the case of a conventional model comprised of a plurality of polygons, the positions (coordinates) and normal lines of the vertices constituting the polygons are defined uniformly only if the position of the model is defined. In other words, if the model matrix of the model is determined and the model matrix is multiplied with the coordinate data and normal line data, then the new coordinate data and normal line data are defined. This means that the drawing (rendering) of the model can be executed at this point. That is, the drawing of the model can be executed if the matrix operation ends.

In the case of the integrated shaping model (envelope), however, which is influenced by other models, the drawing of the model cannot be executed until all the weight calculation end for those influences.

So in accordance with the present embodiment, if the weight calculation of a model has not completed, an non-drawing command DRAWCP (ADD) is generated in the polygon list of that model, and is registered in the later mentioned non-drawing table shown in FIG. 21, so as to secure the common vertex buffer area for the next model (S50). The attribute data ADD of the above non-drawing command indicates an address of the polygon list. In the case of the example in FIG. 19, the non-drawing command DRAWCP (ADD) is written at the beginning of the polygon list of the model M1. As a result, the polygon list of the model M1 completes. DRAWCP is an abbreviation for "DRAW Cash Polygon".

If the weight calculation of the model has ended, on the other hand, then a drawing command DRAWCP (ADD) is added to the polygon list of the model (S52). And the area of the common vertex buffer is released. Or, rather than adding the drawing command, a rule where the drawing (rendering) of the model can be executed immediately if a non-drawing command is not written in the polygon list may be set. In other words, when the matrix calculation and the weight calculation for the vertex list of the model ends, the drawing (rendering) may be executed as a default. In this case, the above mentioned drawing command is not added to the polygon list of the model, and whether the non-drawing command exists or not becomes critical.

When the calculation for the vertex list of the model ends, the vertex list and the polygon list of the model are output (S54). The polygon list includes the registration ID of the non-drawing table for the non-drawing command, and the registration ID of the drawing table for the drawing command.

Even if operations for all the vertices in the vertex list of the model have not ended, the end of the weight calculation of the non-drawing model must be detected by referring to the counter value for each model (S58). Also a drawing command DRAWDP (ADD) is generated in the polygon list of the currently processing model for the non-drawing model for which weight calculation ended. As a result, the area of the common vertex buffer for the model for which drawing became possible is released (S60). DRAWDP is an abbreviation for "DRAW Draw Polygon".

The above simulation operation is executed for the vertex lists of all the models.

To understand the above more concretely, the examples in FIG. 18 and FIG. 19 are used for explanation. FIG. 20 is an example of the polygon list to be generated in this case, and FIG. 21 is an example of the non-drawing table. At first, the converter executes the matrix calculation and the weight calculation for the vertex list of the model M1, and writes the result in the corresponding areas in the common vertex buffer. Since the weight calculation has not ended, even when operations for all the vertex data in the vertex list ends, the non-drawing command DRAWCP (0) is registered at the beginning of the polygon list 145 for the model M1. At this time, the correspondence between the first address ADD1 of the polygon list and the attribute data "0" of this command is registered in the non-drawing table 143.

Then the converter executes the matrix calculation and the weight calculation for the vertex list of the model M2 in the same way, and writes or integrates (adds) the result in the corresponding areas in the common vertex buffer. Also since the weight calculation for the vertices of the model M1 has not ended when the calculation for all the vertices of the vertex list of the model M2 ends, the same processing is executed for the next model, model M3. When the processing for the vertex list of the model M4 ends, the weight calculation for actual vertices of the model M1 ends, and the drawing of the model M1 becomes possible. So the drawing command DRAWDP (0) for the model M1, which has been in the non-drawing state, is registered in the beginning of the polygon list 147 of the model M4.

In the vertex list of the model M5, not shown in FIG. 19, all the vertices belong to the native group, therefore the model M5 is in a drawing enabled state when the matrix calculation and the weight calculation of the vertex list of the model M5 ends, therefore the drawing command DRAW for the model M5 is registered in the polygon list 146 of the model M5. Or, if the drawing is executed as the default when a non-drawing command is not registered, then it is unnecessary to register the drawing command DRAW for the model M5.

Each polygon list 145, 146 and 147 includes polygon names PG and vertex IDs of the vertices constituting the polygons. For the vertex IDs, new consistent vertex IDs vx0 and vx1, which were assigned in the common vertex buffer, are used in the case of the example in FIG. 20. The polygon list may be created using an actual address based on the entry number and offset value when the common vertex buffer was generated as the vertex ID. An example of this will be explained later.

In the non-drawing table 143 in FIG. 21, the first address ADD1 of the polygon list of the model corresponds to ID=0 of the model M1. The non-drawing table 143 is not always necessary, and the first address ADD1 of the polygon list may be directly assigned to the attribute data of the non-drawing command DRAWCP.

As explained above, the converter generates conversion data (not in real-time), which has the format information of the common vertex buffer and the vertex list and polygon list of each model, from the original data of the integrated shaping model, which was generated by a three dimensional modeler. This conversion data is recorded in a recording medium for games, e.g. CD-ROM, along with the game program and the drawing library.

Now vertex IDs when the common vertex buffer is generated and released will be explained. FIG. 22 is a drawing which explains vertex IDs. In the example in FIG. 22, the model M6, which has a polygon to be traced next, is added to the above mentioned models M1–M5 to easily explain vertex IDs. FIG. 22A shows a state when the vertices of the model are sorted into native, start weight, middle weight and end weight groups, and the format of the vertex buffer is created from the vertices which belong to the native and start weight groups. In this state, a serial number vx0–vx(h+i+j−1) is assigned to all the vertices. Here h, i and j are the offset values of the models M1, M5 and M6 respectively. It is assumed that the converter has executed a simulation operation in this state, by which the common vertex buffer areas were generated and released, as shown in FIG. 22B.

Among the above mentioned models M1–M5, the models M1 and M5 have actual vertices. And the operation for the vertex list is executed in the sequence of the models M1, M2, M3, M5 and M4, which is the tracing sequence of the model hierarchy. Therefore if the first address of the common vertex buffer area is ADDm, then the common vertex buffer area of the model M1 is generated first at the address ADDm or later (FIG. 22B (B-1)). Then the common vertex buffer area of the model M5 is generated after the area of the model M1 (FIG. 22B (B-2)). At this point, the address of the vertex of the model M1 is specified by the first address ADDm and the entry value 0–(h−1). The address of a vertex of the model M5 is specified by the first address ADDm plus the offset value h of the model M1 and the entry value 0–i of the model M5. Therefore at this point, the address of a common vertex of the models M1 and M5 is specified by a serial number 0–(h+i−1). This address is used for the vertex ID.

In other words, the drawing of the models M1 and M5 is executed at this point, then the common vertex buffer areas of the models M1 and M5 are released. Therefore these addresses can be used for all the vertex IDs of the polygon lists of the models M1 and M5. This increases the processing efficiency of the drawing library.

When the drawing of the models M1 and M5 ends, the common vertex buffer areas for the models M1 and M5 are no longer necessary. The common vertex buffer area of the model M6 to be drawn next is therefore generated at the entry number 0–(j−1) from the first address ADDm again. And these addresses are used for the vertex IDs of the vertex list and the polygon list of the model M6. In other words, addresses of the common vertex buffer areas of different models overlap so as to minimize the generation and maintenance of the common vertex buffer areas. Such overlapping of addresses does not cause problems, since the vertex list and the polygon list are referred to in the tracing sequence of the hierarchical structure of the models.

A variant form is to generate a correspondence table between the addresses of the common vertex buffer areas and the consistent vertex IDs by a simulation operation of the converter using the consistent vertex ID vx0–vx (h+i+j−1) for the vertex list and the polygon list. In this case, the drawing library can know the addresses of the buffer areas of the vertex IDs correspond to the vertex list and the polygon list by referring to the correspondence table.

FIG. 23 is a drawing depicting another example of a vertex list. This example is the case when the addresses of the common vertex buffer area are used as vertex IDs. The vertex list 200 has a set (chunk) of vertex data for the four groups between the start description 201 and the end description 203 of the vertex list. 202 is the description denoting the end of the vertex data chunk. In other words, the vertex list 200 has a chunk 218 of the native vertices which have no weight, a chunk 228 of the vertices which belong to the start weight group, a chunk 238 of the vertices which belong to the middle weight group, and a chunk 248 of the vertices which belong to the end weight group. Each chunk has a description 211 denoting the data chunk name of the vertex group which has no weight, and a description 221 denoting the data chunk name of the vertex group which has weight. These descriptions include a flag 212 indicating weight calculation continuance, a chunk size 213, and a classification of start, middle and end, 222, 232 and 242.

Each chunk also includes descriptions to denote the offset value 214 of the vertex list block of the common vertex buffer and the number of vertex data 215 in that chunk. The vertex data has the coordinate data 216 (VERT), the normal line data 217 (NORM) and the weight data(NFlagsW), just like the case shown in FIG. 19. The weight data(NflagsW) has the entry number 226 of the vertex in the common vertex buffer and the weight value (%) 227. The area (vertex ID) of an actual vertex in the common vertex buffer can be specified by the offset value 214 and the entry number 226.

Figure 24:
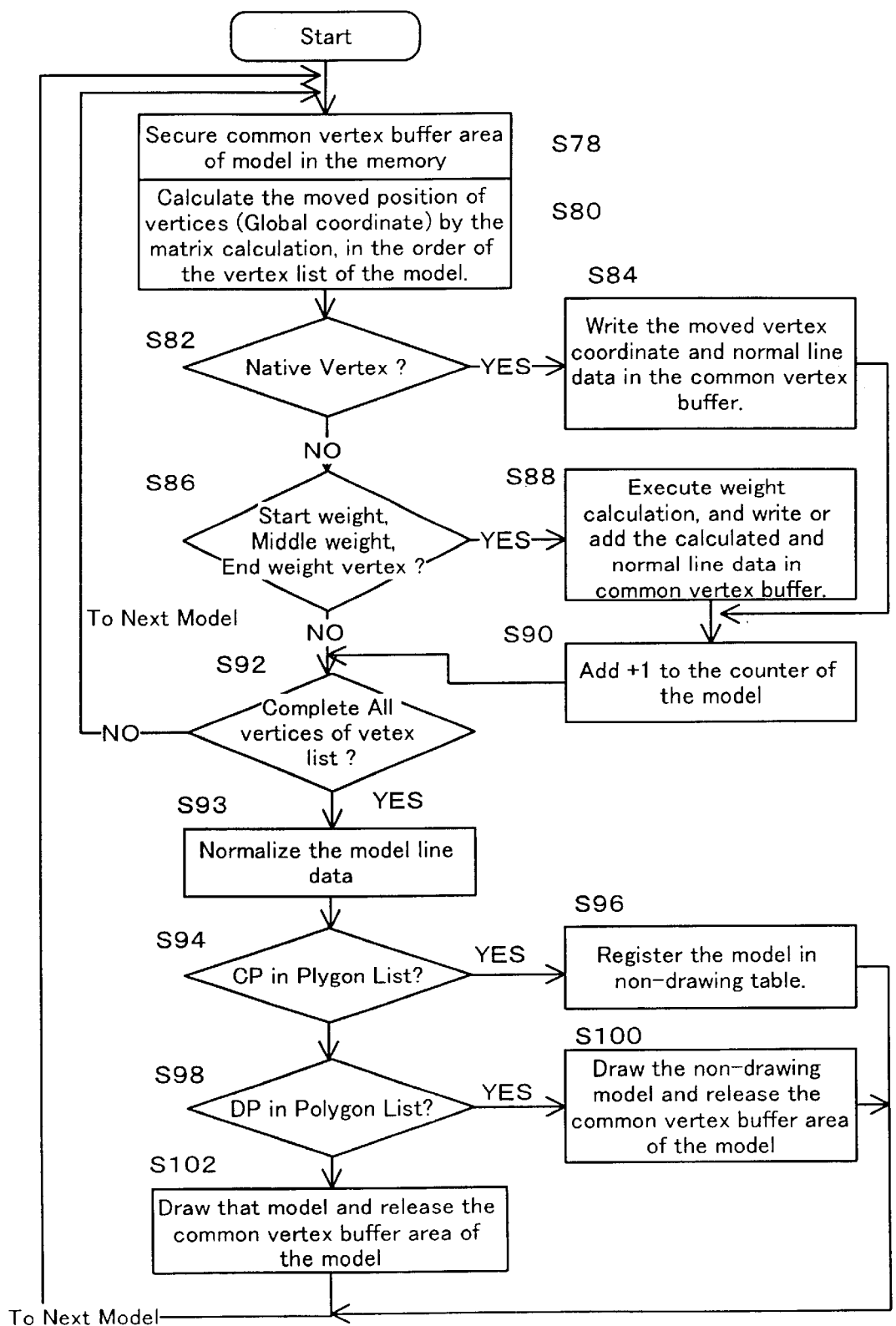
FIG. 24 is a flow chart depicting a procedure of the drawing library.

Next a procedure of the drawing library will be explained. FIG. 24 is a flow chart depicting a procedure of the drawing library. As shown in FIG. 13, the game program generates the matrix to move models constituting characters responding to the control data which the operator inputs when the game is progressing (S22). Then the drawing library draws the polygons (S24).

The procedure of the drawing library is similar to the simulation operation of the converter. The drawing library draws polygons in real-time using the conversion data. The drawing library determines the coordinate data and normal line data of the vertices after movement by the matrix calculation in the sequence of the vertex list of each model, according to the tracing sequence of the hierarchical structure of the models (S80). The coordinate data and normal line data are determined by multiplying the conversion data by the model matrix, and are then converted to the global coordinate system (S80). Along with this matrix calculation, the common vertex buffer area of the model is secured in the memory (S78). Such a common vertex buffer area can be secured for as much as is needed based on the format information in the conversion data. If the vertex for which the matrix calculation is executed is a vertex that is sorted to the native group (S82), then 100% (1.0) is merely multiplied in the weight calculation, so actually the coordinate data and normal line data determined by the matrix operation are recorded in the corresponding area of the common vertex buffer (S84).

If the matrix for which the matrix operation is executed is a vertex which has weight, that is, a vertex which belongs to the start weight, middle weight or end weight group (S86), then weight calculation is executed using the weight data, and the coordinate data and normal line data in the calculation result is written or integrated (added) in the corresponding common vertex buffer. In the case of a vertex which belongs to the start weight group, which is a vertex appearing first, the calculation result is written in the common vertex buffer, but in the case of a vertex which belongs to the middle weight or end weight group, the calculation result is integrated with (added to) the value already written there. And the counter of the model where the calculation result is recorded is incremented +1 (S90).

The above matrix calculation and weight calculation are executed for all the vertex data in the vertex list of the model (S92). Since consistent IDs are used for all the vertex IDs, and the vertex IDs correspond with the reference indexes of the vertex data area of the common vertex buffer, this weight calculation can be executed at very high-speed. The vertex list is also divided for each model. Therefore the same model matrix can be used repeatedly for the vertices within the same model in the matrix calculation. This means that it is unnecessary to frequently change the model matrix to be set in the CPU during the matrix calculation by the drawing library. This increases the matrix calculation efficiency and enables drawing in real-time.

The vertex list is grouped to each vertex group so that the procedure of the weight calculation for a group of vertices can be unified. In other words, in the case of the vertices which belong to the native group, the matrix calculation result is directly written in the common vertex buffer, in the case of the vertices which belong to the start weight group, the result of the matrix calculation and the weight calculation is written in the common vertex buffer, and in the case of the vertices which belong to the middle weight and end weight groups, the result of the matrix calculation and weight calculation is integrated with (added to) the data in the common vertex buffer. Since the procedure can be unified in this way, the operation efficiency of the drawing library increases, which enables real-time operation.

When the operation for the vertex list of one model ends, the drawing library refers to the polygon list of that model. If an non-drawing command DRAWCP is written in the polygon list (S94), the drawing (rendering) of the model cannot be executed, so the model is registered in the non-drawing table (S96). If a drawing command DRAWDP for non-drawing model is written in the polygon list (S98), the address of the non-drawing model registered in the non-drawing table is referred to, and the drawing (rendering) of the polygons is executed in the sequence of the polygon list (S100). This rendering of polygons is executed using the coordinate data and normal line data in the global coordinate system based on the operation result stored in the common vertex buffer. Therefore when the drawing of the model ends, the area of the common vertex buffer corresponding to the model is no longer necessary, and is released. Release here means setting the state where the area can be allocated as another common vertex buffer area if necessary. When a drawing command DRAW to instruct drawing the model is written in the polygon list, the drawing (rendering) of that model is executed and the corresponding common vertex buffer area is released (S102).

It is also possible to draw the polygons automatically according to the polygon list of the model when the operation of the vertex list in the model ends, which is a default procedure, as long as no non-drawing command exists. Before executing drawing (rendering), normalization is executed, if necessary for the normal line data for which vertex calculation ends (S93). The normal line data is used to determine the scalar product ($\cos \theta$, $\theta$ is the angle between the vectors) between the vector of the light from the light source and the normalized normal line vector in the rendering step. According to the scalar product, such processing as for diffused light in pixels in the polygons is executed. Therefore, depending on the operation in the rendering process, executing the normalization of a normal line vector (processing to make the scalar value 1) in advance is necessary.

In the drawing (rendering) step by the drawing library, it is unnecessary to secure the common vertex buffer area for all the models in memory. The common vertex buffer area corresponding to a model must be secured until the necessary weight operation ends. However, once all the weight operations end and the model can be drawn, the drawing (rendering) of the polygons of the model can be executed according to the drawing command, which has been pre-registered in the polygon list. When the drawing ends, the vertex data in that common vertex buffer area is no longer necessary, so this area is released so as to make it available as the common vertex buffer area for another model. This means that the capacity of the common vertex buffer area in the memory can be relatively small. This is a big merit for a game machine which can use only a relatively small capacity memory.

In this way, the converter creates the conversion table in advance, so the drawing library, which demands rendering in real-time, can execute the matrix calculation and weight calculation very efficiently, as mentioned above. Also the capacity of the data area (common vertex buffer area) of the actual vertices to be secured in memory can be decreased. Therefore, the drawing library can create images of characters in real-time using the game machine responding to operation by the operator.

In the above embodiment, the processing of conversion data by the converter and processing by the drawing library for multi-weight data, where actual vertices are influenced by a plurality of models in the integrated shaping model, were explained. By using such a multi-weight integrated shaping model, the joint part connecting the polygons and the shape of muscles on the surface can be drawn in a more natural way.

However, depending on the scene in the game, a complicated vertex operation following multi-weight data processing is unnecessary, even for the character comprised of a multi-weight integrated shaping model, if the character is at a distant position from a viewpoint, for example. This is because a character at a distant position from a viewpoint does not require high quality images, unlike a character at the center of the screen at a position near the viewpoint. In such a case, not the vertex operation following multi-weight processing, which requires time and hardware resources for arithmetic processing, but the vertex operation following one weight processing is used, so that image processing time for an entire screen and hardware resources can be minimized. One weight refers to a model comprised only of vertices which are influenced by only one model, that is, comprised only of vertices which belong to the native group.

Figure 25:
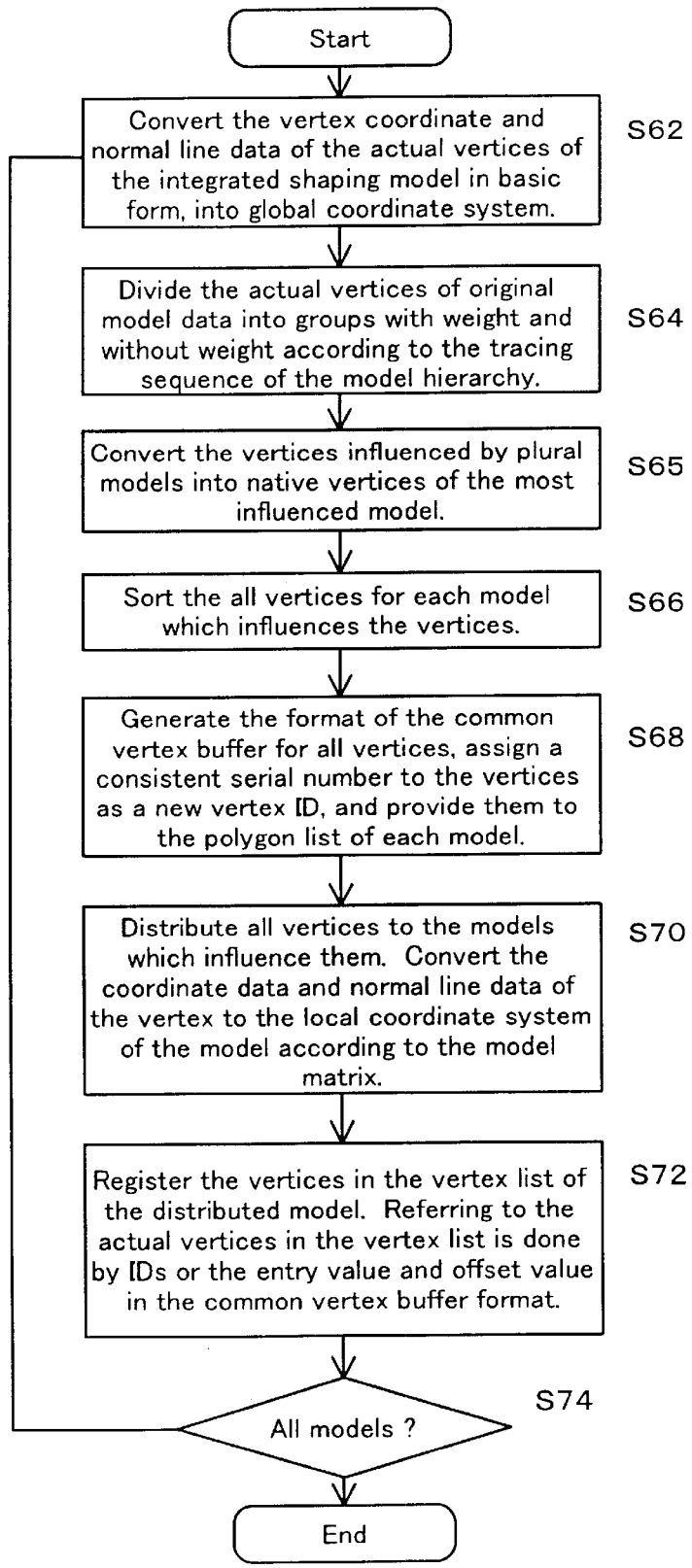
FIG. 25 is a flow chart depicting a procedure of the converter to obtain the one weight vertex list from the data of a multi-weight integrated shaping model

FIG. 25 is a flow chart depicting the procedure of the converter to obtain the one weight vertex list from the data of a multi-weight integrated shaping model. This flow chart is different in part from the flow chart on the distribution of vertices to models and the vertex list generation for multi-weight data shown in FIG. 16.

Converting coordinates and normal line data of actual vertices of the integrated shaping model in basic form to the global coordinate system in Step S62 is the same as the case of multi-weight processing. Then the converter divides the actual vertices of the original model data into groups based on the weight according to the tracing sequence of the hierarchy of the models (S64). That is, the actual vertices of the original model data are divided into the native group and the other groups used for multi-weight. Then the converter converts the vertices, which have weight (influence) from a plurality of models, to the native vertices of the model which weight is largest (S65). In the case of the example in FIG. 8, for example, in the vertex V102, which has weight from the three models M2, M3 and M4, the weight value from the model 4 is the largest, 40%, so among the three vertices V102 (M2), V102 (M3) and V102 (M4), only the vertex V102 (M4) is set as a vertex belonging to the model M4, and the other vertices V102 (M2) and V102 (M3), whose weight value is small, are ignored. As a result, the vertex V102 becomes the native vertex which is influenced 100% by the model M4.

By the processing in Step S65, all the vertices become single weight vertices which are influenced by one model. Processing hereafter is the same as the case of the multi-weight in FIG. 16. That is, the vertices are sorted for each model which influence the vertices (S66), and consistent numbers are assigned to all the vertices as new vertex IDs, which are also used on the polygon list of each model (S68). Or, just like the case of multi-weight, a vertex ID based on the offset value and entry number of the common vertex buffer may be used.

Then the converter distributes all the vertices to the models which influence the vertices (models where the vertices belong), and converts the vertex data to the local coordinate system of the model (S70). And the converter registers these distributed vertices to the vertex list of the distribution destination model (S72). Since this case concerns single weight, no such groups as a native group or start weight group exist in the vertex list of each model, unlike the case of multi-weight, and all the vertices become native vertices. Actual vertices in the vertex list have, of course, vertex IDs, based on the format of the common vertex buffer.

In other words, in the case of single weight, a list of actual vertices constituting the polygons of the model is created for each model in the common vertex buffer area, and a list of the native vertices which the model influences is created in the vertex list of each model. Therefore, if such a single weight conversion data is used, the drawing library can execute only one vertex operation for one vertex, which simplifies the drawing process and enables high-speed drawing processing.

The single weight conversion data is preferably generated for all the multi-weight format models by the converter. Therefore, for the multi-weight format models, the converter generates multi-weight format conversion data according to FIG. 16, and single weight format conversion data according to FIG. 25. The drawing library executes the drawing processing using the single weight format conversion data during a game, when the precise movement of models is not required, for example, when a character to be drawn is at a position distant from a viewpoint, or when the character is not at the center of the screen, or when the character is at a position behind a semi-transparent polygon. And the drawing library executes drawing processing using the multi-weight conversion data only for characters at the most outstanding position at the center of the screen. As a result, the load on drawing processing required for the entire screen can be decreased.

According to the present invention, model conversion data with an optimum data structure can be provided to the drawing library, which is recorded in a recording medium for games (or simulation), and executes image processing in real-time, therefore integrated shaping models which can implement a more natural movement of joints and outer surface of characters can be drawn in real-time.

According to the present invention, an image processing method (converter), which converts data of an integrated type model generated by a three dimensional modeler to data of a model having an optimum data structure for the drawing library, which is recorded in a recording medium for games (or simulation) and executes image processing in real-time, is provided. Therefore, the model data in the integrated shaping model format using the three dimensional modeler can be used for game machines (or simulators), and a more natural movement of objects can be provided for games.

Also, according to the present invention, an image processing method, to efficiently draw integrated shaping models using conversion data, or a recording medium recording a program for a computer to execute the image processing method, can be provided, therefore characters comprised of integrated shaping models can be drawn in real-time, and images of characters can be created with a more natural movement by a game machine.

What is claimed is:

1. A computer-readable recording medium recording integrated shaping model data having a plurality of models linked by a hierarchical structure where at least a first model has a plurality of vertices constituting polygons, and at least the position of a first vertex is influenced by positions of a plurality of models and weight values from these models, comprising:

format data of a common vertex buffer for saving the data on the plurality of vertices in said plurality of models for each model;

a vertex list which is created for each one of said models which influence the vertices and has vertex data specified by a vertex ID in said common vertex buffer;

model matrix data which is created for each one of said models and sets the model positions of said plurality of models in basic forms; and a polygon list which is created for each one of said models having the polygons and has polygon data where said vertex ID is attribute data, wherein the vertex data in said vertex list has at least the position data of the vertex, a weight value from the model where said vertex list belongs, and vertex ID in said common vertex buffer corresponding to the vertex.

2. The computer-readable recording medium recording integrated shaping model data according to claim 1, wherein said first vertex influenced by said plurality of models has distributed vertex data for the number of said plurality of models, and said distributed vertex data belongs to said vertex lists of the models which influence said first vertex.

3. The computer-readable recording medium recording integrated shaping model data according to claim 2, wherein said vertex list is divided into start weight vertices, for which the vertex operation is executed first when tracing is executed according to the hierarchical structure of said models, middle weight vertices, for which said vertex operation is not executed first or last, and end weight vertices, for which said vertex operation is executed last.

4. The computer-readable recording medium recording integrated shaping model data according to one of claims 1 to 3, wherein said vertex list further has data on native vertices which are influenced only by the model which this vertex list belongs to.

5. The computer-readable recording medium recording integrated shaping model data according to one of claim 1, wherein said vertex data has coordinate data and normal line data of said vertices.

6. The computer-readable recording medium recording integrated shaping model data according to claim 5, wherein said vertex data follows a local coordinate system of the model of the vertex list which the vertex data belongs to.

7. The computer-readable recording medium recording integrated shaping model data according to one of claim 1, wherein the vertex ID in said common vertex buffer has an entry number of the vertex of each model and the offset value corresponding to the number of vertices of each model.

8. The computer-readable recording medium recording integrated shaping model data according to one of claim 1, wherein said polygon list has a drawing command which instructs the drawing of said polygon of a predetermined model, or a non-drawing command which instructs not to draw the polygon of the model which this polygon list belongs to.

9. A computer-readable recording medium recording integrated shaping model data, having a plurality of models linked by a hierarchical structure where at least a first model has a plurality of vertices constituting polygons, and at least a first vertex position is influenced by positions of a plurality of models and weight values from these models, comprising:

format data of a common vertex buffer for saving the data on the plurality of vertices in said plurality of models for each model;

a vertex list which is created for each one of the models which influence said vertices and has vertex data specified by a vertex ID in said common vertex buffer; and a polygon list which is created for each one of said models having said polygons and has the polygon data where said vertex ID is attribute data.

10. An image processing method for converting original model data into integrated shaping model data having a plurality of models linked by a hierarchical structure where at least a first model has a plurality of vertices constituting polygons, and at least the position of a first vertex is influenced by positions of a plurality of models and weight values from these models, wherein said original model data has a plurality of model data linked by said hierarchical structure, said original model data comprises an original vertex list having vertex data of this model, a weight list having vertex data on vertices which this model influences, and an original polygon list where the vertex ID of said vertex list is attribute data, and said image processing method comprises the steps of:
generating format data of a common vertex buffer to store data on the plurality of vertices in said plurality of models for each model;

generating a vertex list which is created for each model which influences said vertices, and has vertex data specified by a vertex ID in said common vertex buffer; and generating a polygon list which is created for each model having said polygons where said vertex ID is attribute data.

11. The image processing method for converting model data according to claim 10, wherein the vertex data in said vertex list has at least the position data of the vertices, weight values from the model which said vertex list belongs to, and vertex IDs in said common vertex buffer corresponding to these vertices.

12. The image processing method for converting model data according to claim 11, wherein said step for generating the vertex list generates distributed vertices for the number of said plurality of models for said first vertex which is influenced by said plurality of models, and distributes the data on said distributed vertices to said vertex list of the models which influence the first vertex.

13. The image processing method for converting model data according to claim 12, wherein said step for generating the vertex list divides said vertex data into data for start weight vertices, for which the vertex operation is executed first when tracing is executed according to said hierarchical structure of the models, data for middle weight vertices, for which said vertex operation is not executed first or last, and data for end weight vertices, for which said vertex operation is executed last, in said vertex list.

14. The image processing method for converting model data according to one of claims 10 to 13, wherein said vertex ID has an entry number of the vertex in each model, and an offset value corresponding to the number of vertices of each model.

15. The image processing method for converting model data according to one of claim 10, further comprising a drawing command generation step where: a dummy vertex operation is executed for the vertex data in the vertex list of the model according to the sequence of tracing following the hierarchical structure of the models;

when said dummy vertex operation for the vertex list of one model ends, a non-drawing command is generated in the polygon list of this model if the weight calculation for the vertices of this model has not ended; and a drawing command for said non-drawing model is generated in the polygon list of the target model of said dummy vertex operation if the weight calculation for the vertices of the non-drawn model ends.

16. The image processing method for converting model data according to claim 10, further comprising a one weight vertex list generation step, where said first vertex which is influenced by said plurality of models is converted to a vertex which is influenced only by a model having the largest degree of influence among said plurality of models, and the data on said converted vertex is distributed to said vertex list of this model.

17. An image processing method for drawing an integrated shaping model which has a plurality of models linked by a hierarchical structure, where at least a first model has a plurality of vertices constituting polygons and at least the position of the first vertex is influenced by positions of a plurality of models and weight values from these models, wherein the data of said integrated supply model comprises:

format data of a common vertex buffer which stores data on the plurality of vertices in said plurality of models for each model;

a vertex list which is created for each model which influences said vertices and has vertex data specified by a vertex ID in said common vertex buffer; and a polygon list which is created for each model having said polygons and includes polygon data where the vertex ID is attribute data, said image processing method comprising the steps of:

generating the common vertex buffer corresponding to said plurality of models in the sequence of tracing of said hierarchical structure according to said format data;

generating model matrix data where the positions of the models are set based on the game progress data;

generating common vertex data by executing matrix calculation for generating vertex data after movement according to said model matrix data and weight calculation for integrating weight values from said models to said vertex data after movement, for the vertex data of the vertex list of said models, and by storing or adding this calculated vertex data to areas according to said vertex IDs in said common vertex buffer; and rendering said polygons according to said common vertex data.

18. The image processing method according to claim 17, wherein the vertex data in said vertex list has at least the position data of the vertices, weight values from the model which said vertex list belongs to, and the vertex IDs in said common vertex buffer corresponding to these vertices, and in said step of generating the common vertex data, said position data is multiplied by said model matrix for said matrix calculation, and said operated position data is multiplied by said weight value for said weight calculation.

19. The image processing method according to claim 18, wherein said vertex list is divided into start weight vertices, for which the vertex operation is executed first when tracing is executed according to said hierarchical structure of said models, middle weight vertices, for which said vertex operation is not executed first or last, and end weight vertices, for which said vertex operation is executed last, and in said step of generating the common vertex data, said operated vertex data for said start weight vertices is stored in areas corresponding to said vertex IDs in said common vertex buffer, said operated vertex data for said middle weight vertices and end weight vertices are added to the vertex data in areas corresponding to said vertex IDs in said common vertex buffer.

20. The image processing method according to claim 17 or 18, wherein said polygon list has a drawing command to instruct to draw said polygons of a predetermined model or a non-drawing command to instruct not to draw the polygons of the model which this polygon list belongs to, and said rendering step refers to the polygon list of the model each time said common vertex data generation step of each model ends, and executes said rendering according to said drawing command.

21. The image processing method according to claim 20, further comprising a step for releasing the area of said common vertex buffer corresponding to the model for which said rendering is executed.

22. The image processing method according to claim 17, wherein said model data also has a one weight vertex list where said first vertex which is influenced by said plurality of models is converted to a vertex which is influenced only by the model which degree of influence is the largest among said plurality of models, and data of said vertex is distributed in said vertex list of this model, and said image processing method generates said common vertex data for a predetermined model according to said one weight vertex list.

23. A recording medium recording image processing program for drawing an integrated shaping model which has a plurality of models linked by a hierarchical structure, where at least a first model has a plurality of vertices constituting polygons and at least the position of a first vertex is influenced by positions of a plurality of the models and weight values from these models, wherein said recording medium records data on said integrated shaping model, and the data on the integrated shaping model comprises:

format data of a common vertex buffer which stores data on said plurality of vertices in said plurality of models for each model;

a vertex list which is created for each model which influences said vertices and has vertex data specified by a vertex ID in said common vertex buffer; and a polygon list which is created for each model having such polygons and includes polygon data where said vertex ID is attribute data, and wherein said image processing program comprises a program code causing a computer to execute procedures of:

generating the common vertex buffers corresponding to said plurality of models in the sequence of tracing of said hierarchical structure according to said format data;

generating model matrix data where the relative positional relationship among the models are set based on the game progress data;

generating common vertex data by executing matrix calculation for generating vertex data after movement according to said model matrix data and weight calculation for integrating the weight values from said models to said vertex data after movement, for the vertex data of the vertex list of said models, and by storing or adding the operated vertex data to areas according to said vertex IDs in said common vertex buffer; and rendering said polygons according to said common vertex data.

24. The recording medium recording image processing program according to claim 23, wherein the vertex data in said vertex list has at least position data of the vertices, the weight value from the model which said vertex list belongs to, and the vertex ID in said common vertex buffer corresponding to this vertex, and in said procedure of generating the common vertex data, said position data is multiplied by said model matrix for said matrix calculation, and said operated position data is multiplied by said weight value for said weight calculation.

25. The recording medium recording image processing program according to claim 24, wherein said vertex list is divided into start weight vertices, for which the vertex operation is executed first when tracing is executed according to said hierarchical structure of said models, middle weight vertices, for which said vertex operation is not executed first or last, and end weight vertices, for which said vertex operation is executed last, and in said procedure of generating the common vertex data, said operated vertex data for said start weight vertices is stored in areas corresponding to said vertex IDs in said common vertex buffer and said operated vertex data for said middle weight vertices and end weight vertices are added to the vertex data in the areas corresponding to said vertex ID s in said common vertex buffer.

26. The recording medium recording image processing program according to claim 23 or 24, wherein said polygon list has a drawing command to instruct to draw said polygons of a predetermined model or a non-drawing command to instruct not to draw the polygons of the model which this polygon list belongs to, and said rendering procedure refers to the polygon list of the model each time said common vertex data generation procedure of each model ends, and executes said rendering according to said drawing command.

27. The recording medium for recording the image processing program according to claim 26, further comprising a procedure for releasing the area of said common vertex buffer corresponding to the model for which said rendering is executed.

28. The recording medium recording the image processing program according to claim 23, wherein said model data also has a one weight vertex list where said first vertex which is influenced by said plurality of models is converted to a vertex which is influenced only by the model which degree of influence is the largest among said plurality of models, and data of said vertex is distributed in said vertex list of this model, and said image processing program comprises a code to cause a computer to execute procedure to generate said common vertex data for a predetermined model according to said one weight vertex list.

* * * * *